(12) United States Patent
Feldstein et al.

(10) Patent No.: US 9,575,505 B2
(45) Date of Patent: Feb. 21, 2017

(54) MULTI-POSITION UNDER-CABINET MOUNTED CONTROL SYSTEM FOR A PORTABLE TOUCH SCREEN DEVICE

(75) Inventors: George Feldstein, Cresskill, NJ (US); Jeffrey Ausfeld, New York, NY (US)

(73) Assignee: Creston Electronics, Inc., Rockleigh, NJ (US)

( * ) Notice: Subject to any disclaimer, the term of this patent is extended or adjusted under 35 U.S.C. 154(b) by 0 days.

(21) Appl. No.: 13/610,316

(22) Filed: Sep. 11, 2012

(65) Prior Publication Data

US 2013/0063382 A1 Mar. 14, 2013

Related U.S. Application Data

(60) Provisional application No. 61/533,579, filed on Sep. 12, 2011.

(51) Int. Cl.
| | |
|---|---|
| *G06F 1/16* | (2006.01) |
| *H04M 1/04* | (2006.01) |
| *H04L 12/28* | (2006.01) |
| *H04M 1/02* | (2006.01) |

(52) U.S. Cl.
CPC ........... *G06F 1/1626* (2013.01); *G06F 1/1632* (2013.01); *H04L 12/282* (2013.01); *H04M 1/04* (2013.01); *H04M 1/0216* (2013.01); *H04M 1/0237* (2013.01)

(58) Field of Classification Search
None
See application file for complete search history.

(56) References Cited

U.S. PATENT DOCUMENTS

| | | | | |
|---|---|---|---|---|
| 7,738,243 | B2* | 6/2010 | Oshima | 361/679.21 |
| 2003/0214602 | A1* | 11/2003 | Battles et al. | 348/375 |
| 2009/0174998 | A1* | 7/2009 | Struthers et al. | 361/679.41 |
| 2009/0244012 | A1* | 10/2009 | Behar et al. | 345/169 |
| 2010/0217912 | A1* | 8/2010 | Rofougaran | 710/304 |
| 2011/0167181 | A1* | 7/2011 | Minoo et al. | 710/73 |
| 2011/0222238 | A1* | 9/2011 | Staats et al. | 361/679.55 |
| 2011/0267773 | A1* | 11/2011 | Macfarlane | 361/679.55 |
| 2012/0166679 | A1* | 6/2012 | Zawacki et al. | 710/8 |
| 2012/0182680 | A1* | 7/2012 | Wetzel et al. | 361/679.06 |

\* cited by examiner

*Primary Examiner* — Nicholas Lee
*Assistant Examiner* — Duane N Taylor, Jr.
(74) *Attorney, Agent, or Firm* — Crestron Electronics, Inc.

(57) ABSTRACT

Presented is an under-cabinet mounted control system for a portable touch screen device. The control system includes a processor configured for providing an interface between the portable touch screen device and one or more remote systems, and a mounting bracket configured to be mounted under a cabinet, shelf, table, or counter. The control system further includes a touch screen mounting member moveably coupled to the mounting bracket. The touch screen mounting member is configured to releasably hold the portable touch screen device. The control system further includes a docking connector configured for electrically mating with the portable touch screen device and establishing electrical communication between the processor and the portable touch screen device, and a communication means configured for establishing communication between the processor the one or more remote systems.

13 Claims, 27 Drawing Sheets

MULTI-POSITION UNDER-CABINET MOUNTED CONTROL SYSTEM FOR A PORTABLE TOUCH SCREEN DEVICE

BACKGROUND OF THE INVENTION

Technical Field

The present invention relates generally to hand-held electronic touch screen devices such as smart phones, electronic book readers, and tablet personal computers, and more particularly to a system for mounting such devices under a cabinet, counter, table, or shelf, and integrating such devices with various control and automation systems, and augmenting these devices with various external manual hard buttons and/or actuators and/or indicators.

Background Art

Typically, for charging and hard-wired network connectivity, touch screen devices, such as table computers, are either placed in a wall-mounted docking station or a table-top stand/docking station.

A significant drawback of table-top stands is that they occupy valuable table or counter space, which could otherwise be used for something else. Additionally, table-top stands require various wired connections (e.g., power, data) that extend from the table-top stand, across the table, and to the appropriate end connection point (e.g., outlet, network port).

Although wall-mounted docking stations for touch screen devices do not take up valuable table or counter space, they require wall space, which may not be available depending on the particular room. Further, the various wired connections (e.g., power, data) need to be routed through walls.

SUMMARY OF THE INVENTION

It is to be understood that both the general and detailed descriptions that follow are exemplary and explanatory only and are not restrictive of the invention.

In one aspect, the disclosure involves an under-cabinet mounted control system for a portable touch screen device. The control system includes a mounting bracket configured to be mounted under a cabinet, shelf, table, or counter. The control system further includes a touch screen mounting member moveably coupled to the mounting bracket and configured to releasably hold the portable touch screen device; and a docking connector configured for electrically mating with the portable touch screen device.

In another aspect, the disclosure involves an under-cabinet mounted control system for a portable touch screen device. The control system includes a processor configured for providing an interface between the portable touch screen device and one or more remote systems, and a mounting bracket configured to be mounted under a cabinet, shelf, table, or counter. The control system further includes a touch screen mounting member moveably coupled to the mounting bracket and configured to releasably hold the portable touch screen device, a docking connector configured for electrically mating with the portable touch screen device and establishing electrical communication between the processor and the portable touch screen device; and a communication means configured for establishing communication between the processor the one or more remote systems.

In yet another aspect, the disclosure involves an under-cabinet mounted control system for a portable touch screen device. The control system includes a mounting bracket configured to be mounted under a cabinet, shelf, table, or counter. The control system further includes a touch screen mounting member moveably coupled to the mounting bracket and configured to releasably hold the portable touch screen device, and a processor configured for executing a program for interfacing with the portable touch screen device and for controlling and interfacing with one or more remote systems. The control system further includes a docking connector configured for electrically mating with the portable touch screen device and establishing electrical communication between the processor and the portable touch screen device, a communication means configured for establishing communication between the processor the one or more remote systems, and a plurality of hard buttons. At least one of the plurality of hard buttons is configured for use with an application program executing on the portable touch screen device and at least another one of the plurality of hard buttons is configured to execute a fixed function associated with an external device or system.

BRIEF DESCRIPTION OF THE DRAWINGS

The accompanying figures further illustrate the present invention. Exemplary embodiments are illustrated in reference figures of the drawings. It is intended that the embodiments and figures disclosed herein are to be considered to illustrative rather than limiting.

The components in the drawings are not necessarily drawn to scale, emphasis instead being placed upon clearly illustrating the principles of the present invention. In the drawings, like reference numerals designate corresponding parts throughout the several views.

LIST OF REFERENCE NUMBERS FOR THE MAJOR ELEMENTS IN THE DRAWING

Figure 1:
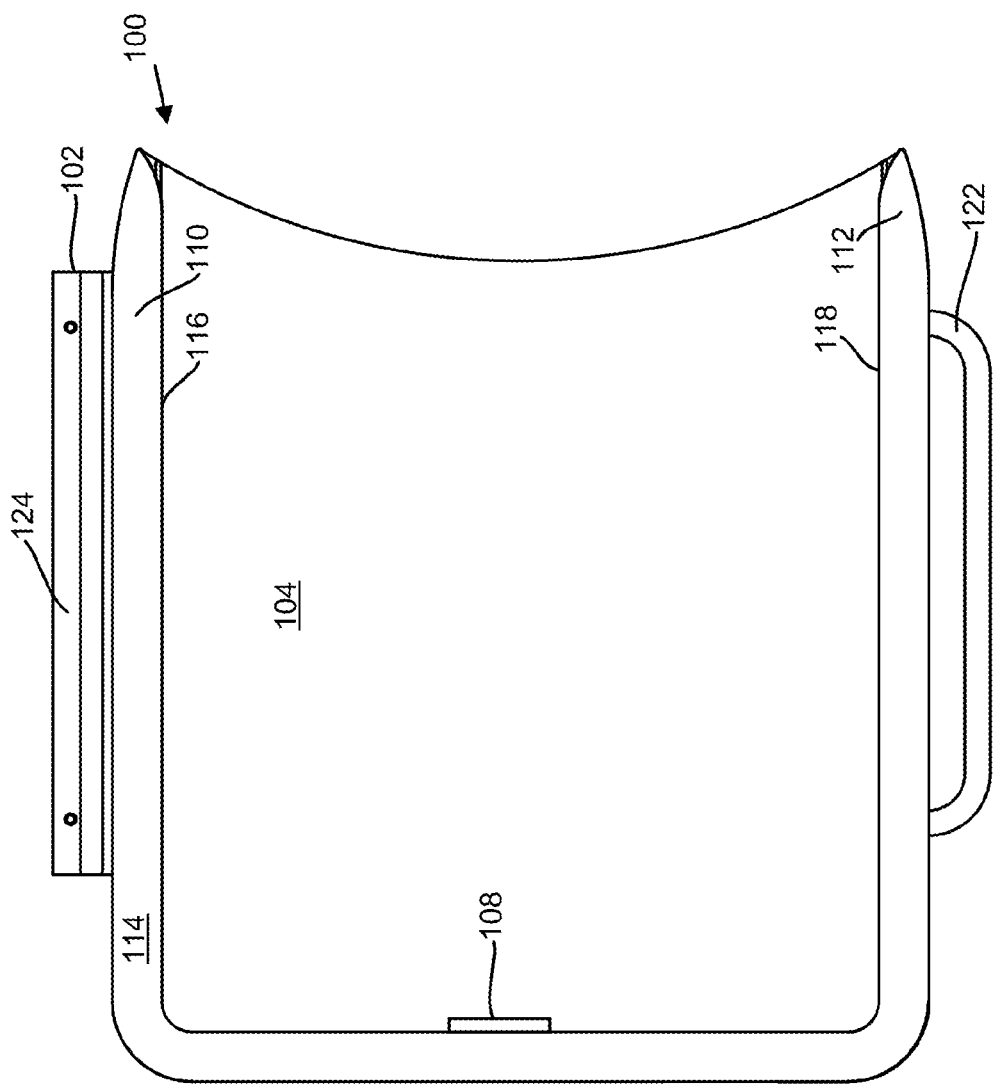
FIG. 1 is an illustrative orthographic front view of an under-cabinet mounted control system for a touch screen device in a 90 degree open position, according to one embodiment of the invention.
Figure 2:
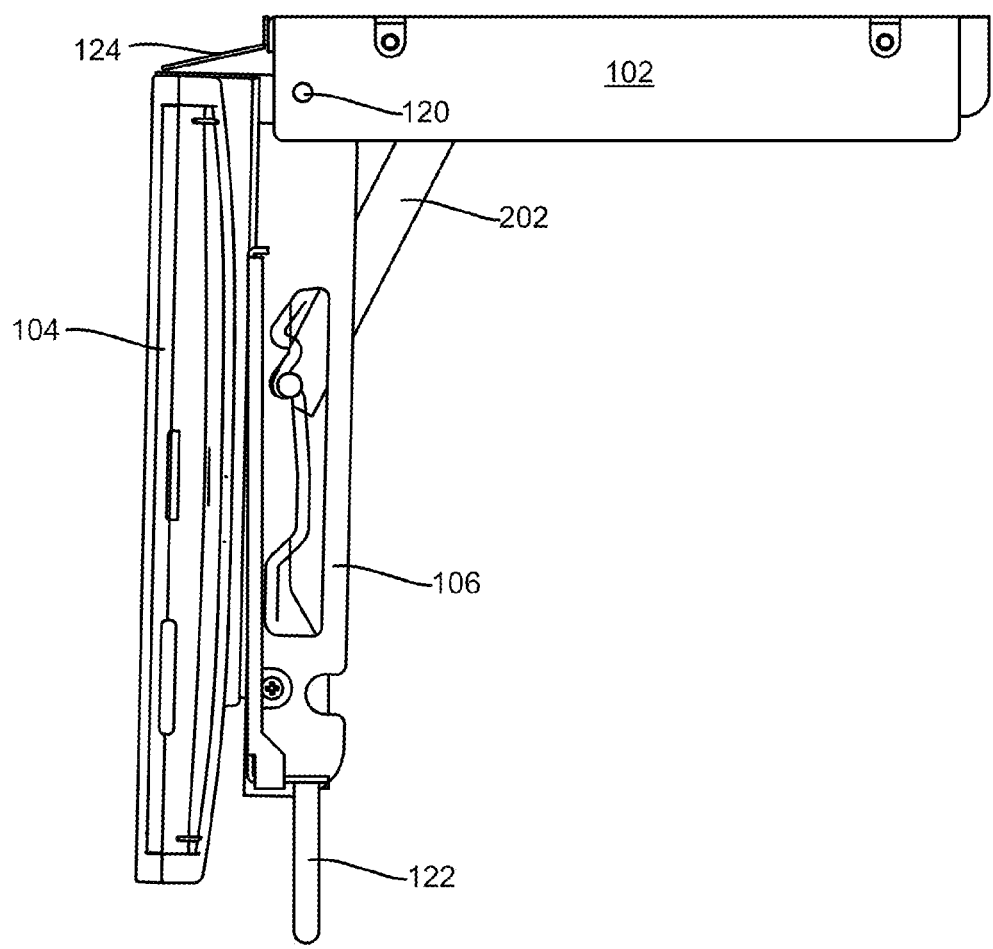
FIG. 2 is an illustrative orthographic side view of the under-cabinet mounted control system for a touch screen device of FIG. 1.
Figure 3:
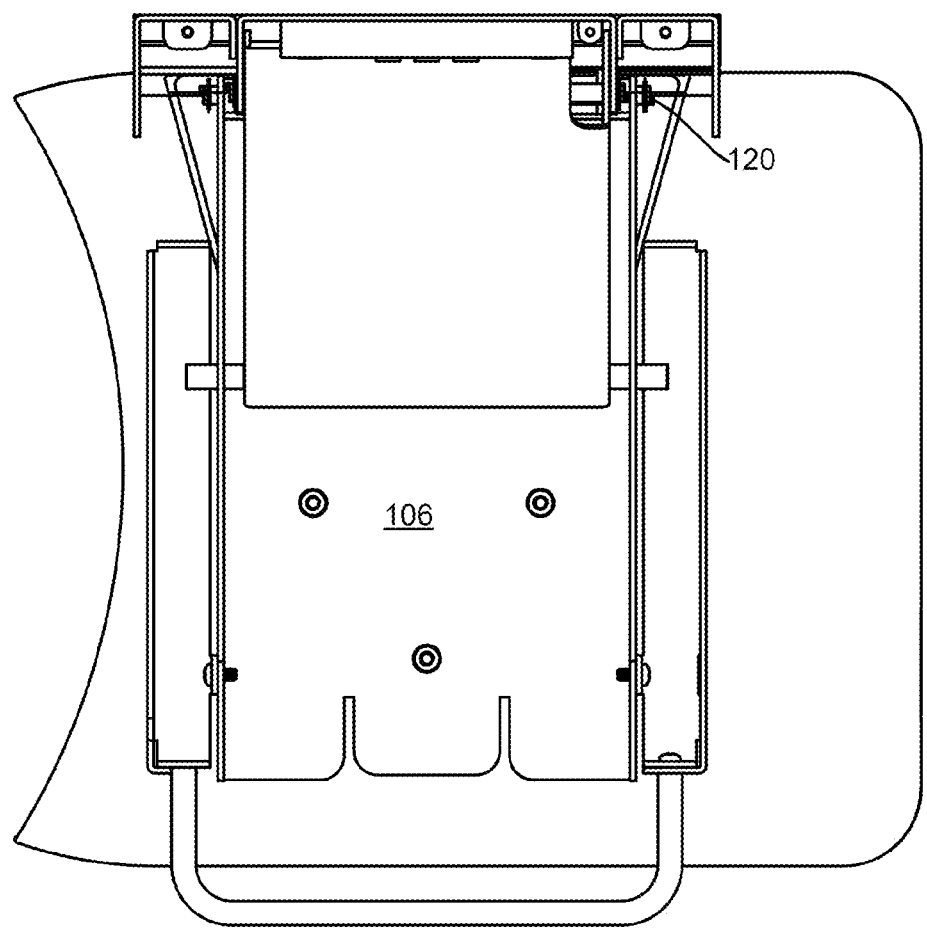
FIG. 3 is an illustrative orthographic rear view of the under-cabinet mounted control system for a touch screen device of FIG. 1.

The following is a list of the major elements in the drawings in numerical order.

100 under cabinet mounted control system
102 housing/mounting member
104 touch screen mounting member
106 touch screen mounting member/bracket
108 docking connector
110 upper track
112 lower track
114 bezel/frame
116 upper groove
118 lower groove
120 hinge
122 handle
124 housing door
202 position locking bar
602 portable touch screen device
604 edge
606 edge
608 edge
702 mounting bracket
704 rotation member
800 housing
802 processor
804 memory
806 authentication coprocessor
808 USB connector
810 Wi-Fi interface
812 Zigbee interface
814 Wi-Fi antenna
816 Zigbee antenna
818 power circuitry
820 directional buttons
822 speaker
824 LEDs/indicator lights
826 bottons
828 LEDs
830 microphone
900 tablet
902 home automation system
904 internet
906 personal computer
910 wireless Wi-Fi gateway
912 Zigbee Gateway
914 keypad
920 lighting
922 HVAC
924 security
926 home theater
928 home audio
930 under cabinet mounted control system
932 portable touch screen device
1000 under cabinet mounted control system
1002 mounting bracket
1004 touch screen mounting member
1005 connecting member
1006 maximum open stop
1008 docking connector
1010 upper track
1012 lower track
1014 bezel/frame
1016 upper groove
1018 lower groove
1020 hinge
1022 power cable
1030 screw holes
1200 under cabinet mounted control system
1202 swivel bracket
1204 machine screws
1206 screw holes
1208 top housing plate 1902 housing
1904 middle housing plate
1906 bottom housing plate
1908 mounting member
1910a pivot connection
1910b pivot connection
1912a cam groove
1912b cam groove
1914a motion arm
1914b motion arm
1916a cam follower
1916b cam follower
2000 shelf, table, counter, or cabinet bottom
2602 tablet computer
2604 docking connector
2606 edge
2608 edge

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

Mode(s) for Carrying Out the Invention

The present disclosure involves a system for removeably mounting a portable touch screen device (e.g., smart phones, tablet computers) under a counter, cabinet, table, or shelf. The under-cabinet control system enables the smart touch screen device to interface with, and control, home theater, home audio, lighting, environmental, and/or security systems (see FIG. 9). In various embodiments, the under-cabinet control system also augments a smart touch screen devices with various external manual hard buttons and/or actuators and/or indicators. In still other embodiments, the under-cabinet control system enables the touch screen device (when mounted thereto) to be oriented in any of a number of positions. The under-cabinet control system also provides power to, and thereby charges, any touch screen device mounted thereto.

The under-cabinet control system, when connected to a smart touch screen device, is capable of transmitting (wired or wirelessly) control commands to a plurality of controllable devices, such as audio and video components, lighting controls, and HVAC controls. In one embodiment, the under-cabinet control system transmits control commands independent of whether or not the touch screen device is on, or a particular application is executing on the touch screen device. In another embodiment, the smart touch screen device executes an application that complements the intended end-use of the under-cabinet control system, such as a graphic user interface that functions as a control panel for an office or home automation system or home theater.

Referring to FIGS. 1-5, in one embodiment, the under-cabinet touch screen control system 100 includes a housing/mounting member 102, a touch screen mounting member 104, a touch screen mounting member bracket 106, a bracket hinge 120, a position locking bar 202, and a housing door 124. The touch screen mounting member 104 includes a docking connector 108, a bezel/frame 114, an upper track 110 with an upper groove 116, a lower track 112 with a lower groove 118, and a handle 122.

The housing/mounting member 102 is configured to be attached to an underside of a counter, shelf, table, or cabinet. The touch screen mounting member bracket 106 is coupled to the touch screen mounting member 104, and moveably coupled to the housing/mounting member 102 via the hinge 120. In various embodiments, the touch screen mounting member 104 is moveable and can be disposed in any position between fully closed (zero degrees from the housing 102, see FIG. 5) and fully open (120 degrees from the housing 102, see FIG. 4) via rotation about the horizontal axis of the hinge 120.

Figure 4:
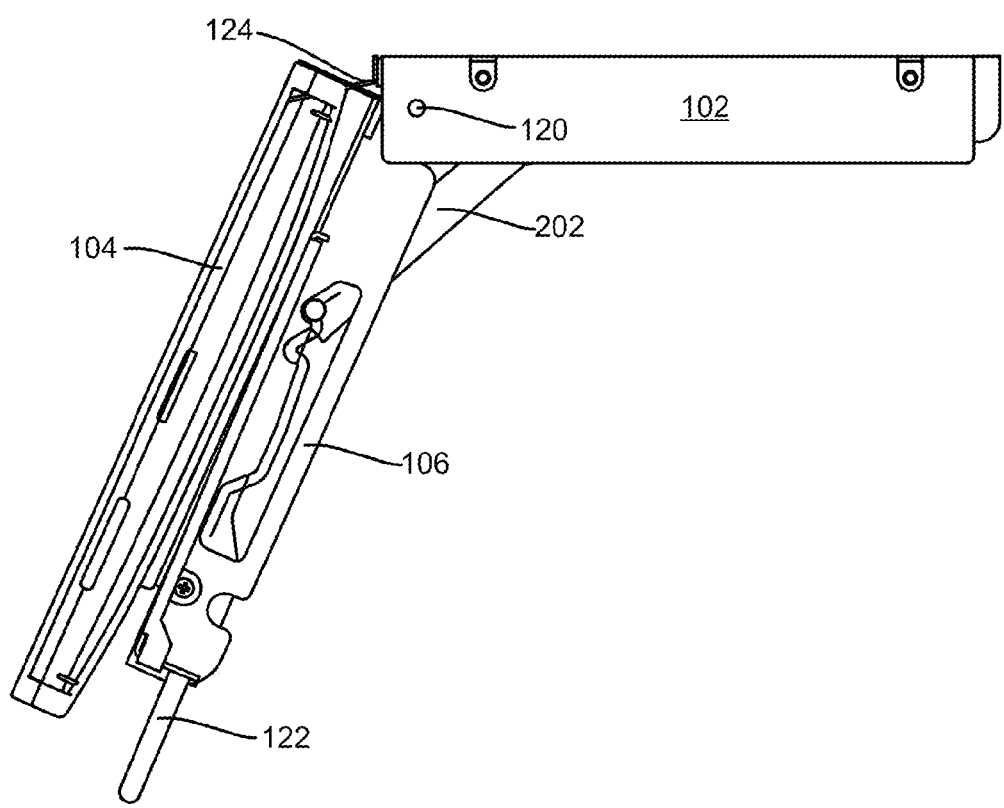
FIG. 4 is an illustrative orthographic side view of the under-cabinet mounted control system for a touch screen device of FIG. 1 in a 120 degree open position.
Figure 5:
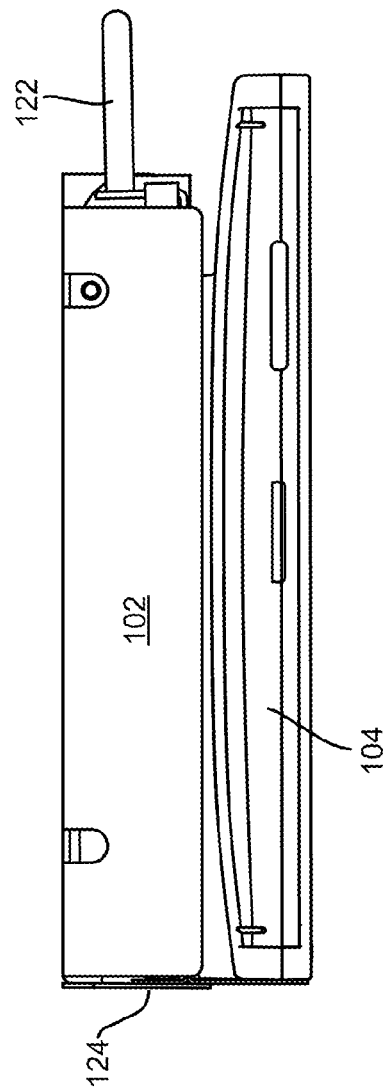
FIG. 5 is an illustrative orthographic side view of the under-cabinet mounted control system for a touch screen device of FIG. 1 in an up or closed position.

For example, the mounting member can be angled up (120 degrees from the housing 102) as in FIG. 4 for easier touch screen typing/data entry, or perpendicular to the cabinet underside (90 degrees from the housing, see FIG. 2) for direct viewing, or angled down (45 degrees from the housing 102) for viewing when the user is sitting below the touch screen mounting member 104 and looking up.

When the touch screen mounting member 104 is in the closed position (FIG. 5), the housing door 124 is closed in order to hide the hinge 122. When the touch screen mounting member 104 is moved to any non-closed position, the housing door 124 opens or moves to an open position to accommodate the various positions of the touch screen mounting member 104 (e.g., see FIGS. 2 and 4).

In one embodiment, the touch screen mounting member 104 stays in a selected position via a friction fit hinge. In another embodiment, the touch screen mounting member 104 stays in a selected position via a locking hinge or position locking bar 202 (see FIG. 2), or by other methods known in the art.

The mounting member 104 is dimensioned to receive a particular touch screen device. In other words, the upper track 110 with the upper groove 116, and the lower track 112 with the lower groove 118 are dimensioned to accommodate and hold a particular size touch screen device. For example, in one embodiment, the upper track 110 with the upper groove 116 and the lower track 112 with the lower groove 118 are dimensioned to accommodate and hold a particular size tablet computer. In another embodiment, the upper track 110 with the upper groove 116 and the lower track 112 with the lower groove 118 are dimensioned to accommodate and hold a particular size smart phone. Further, the docking connector 108 is configured to electrically mate with a connector disposed on the particular touch screen device.

Figure 6:
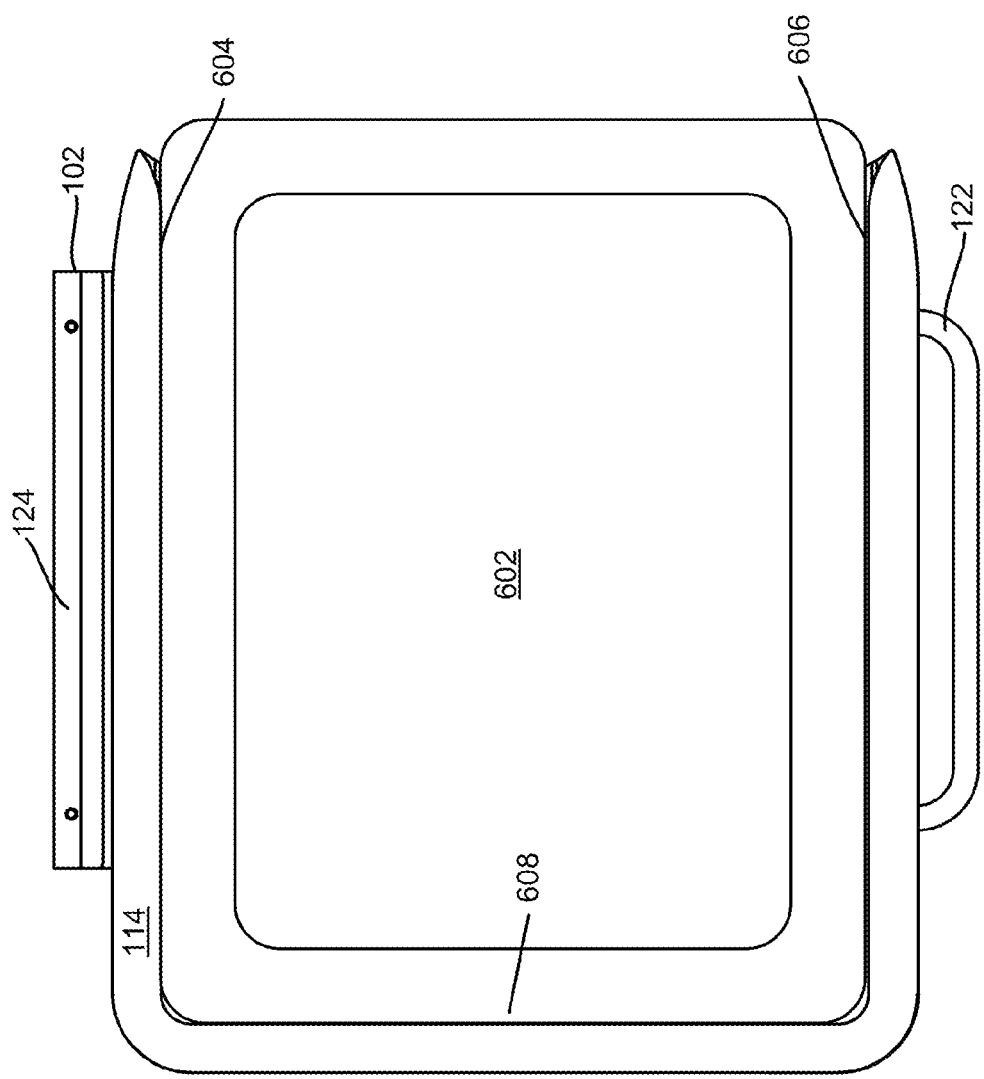
FIG. 6 is an illustrative orthographic front view of the under-cabinet mounted control system of FIG. 1 including a touch screen device disposed therein, according to one embodiment of the invention.

Referring to FIGS. 1 and 6, in one embodiment, in operation, a user moves the mounting member 104 from the closed position (see FIG. 5) to the open position (see FIG. 1) as described above. The user then takes an appropriately sized portable touch screen device 602 and orients the touch screen device 602 so that a connector on the touch screen device 602 is positioned to mate with the docking connector 108. The user then slides opposite edges 604 and 606 of the frame of the touch screen device 602 (i.e., edges that are perpendicular to the edge 608 that include the connector) into the upper groove 116 of the upper track 110 and the lower groove 118 of the lower track 112 (see FIG. 1). The user then pushes the touch screen device 602 until the touch screen device connector electrically mates with the docking connector 108.

Figure 7:
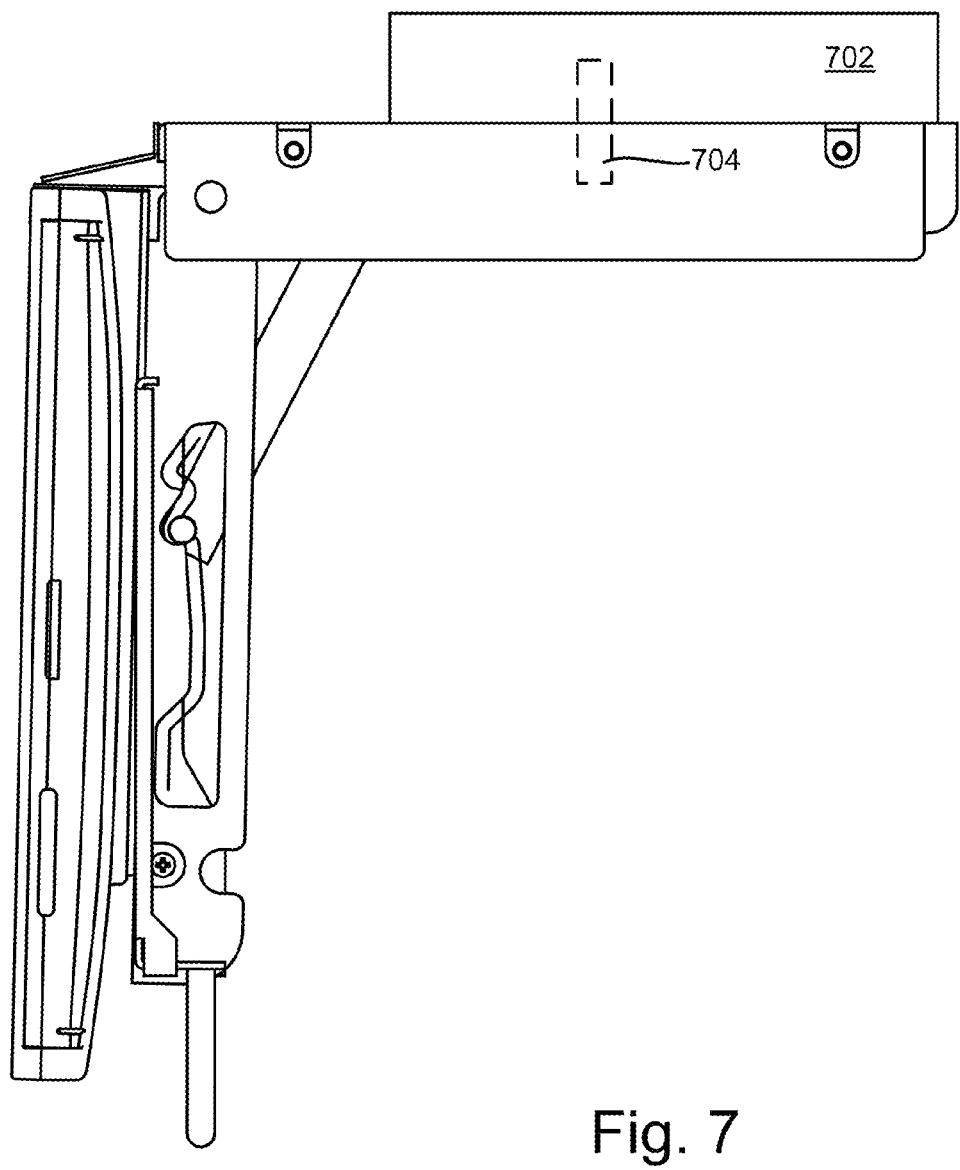
FIG. 7 is an illustrative orthographic side view of the rotatable under-cabinet mounted control system for a touch screen device in the first down or open position, according to one embodiment of the invention.

Referring to FIG. 7, in another embodiment, the under-cabinet control system includes a mounting bracket 702 coupled to the housing 102 via a rotation member 704. The mounting bracket 702 is coupled to the underside of a cabinet, counter, table, or shelf. The housing 102 and coupled touch screen mounting member 104 are rotatable about the vertical axis of the rotation member 704. In other words, in this embodiment, a touch screen device disposed in the touch screen mounting member 104 has two degrees of movement (i.e., movement about the horizontal axis of the hinge 120 and about the vertical axis of the rotation member 704).

Figure 8:
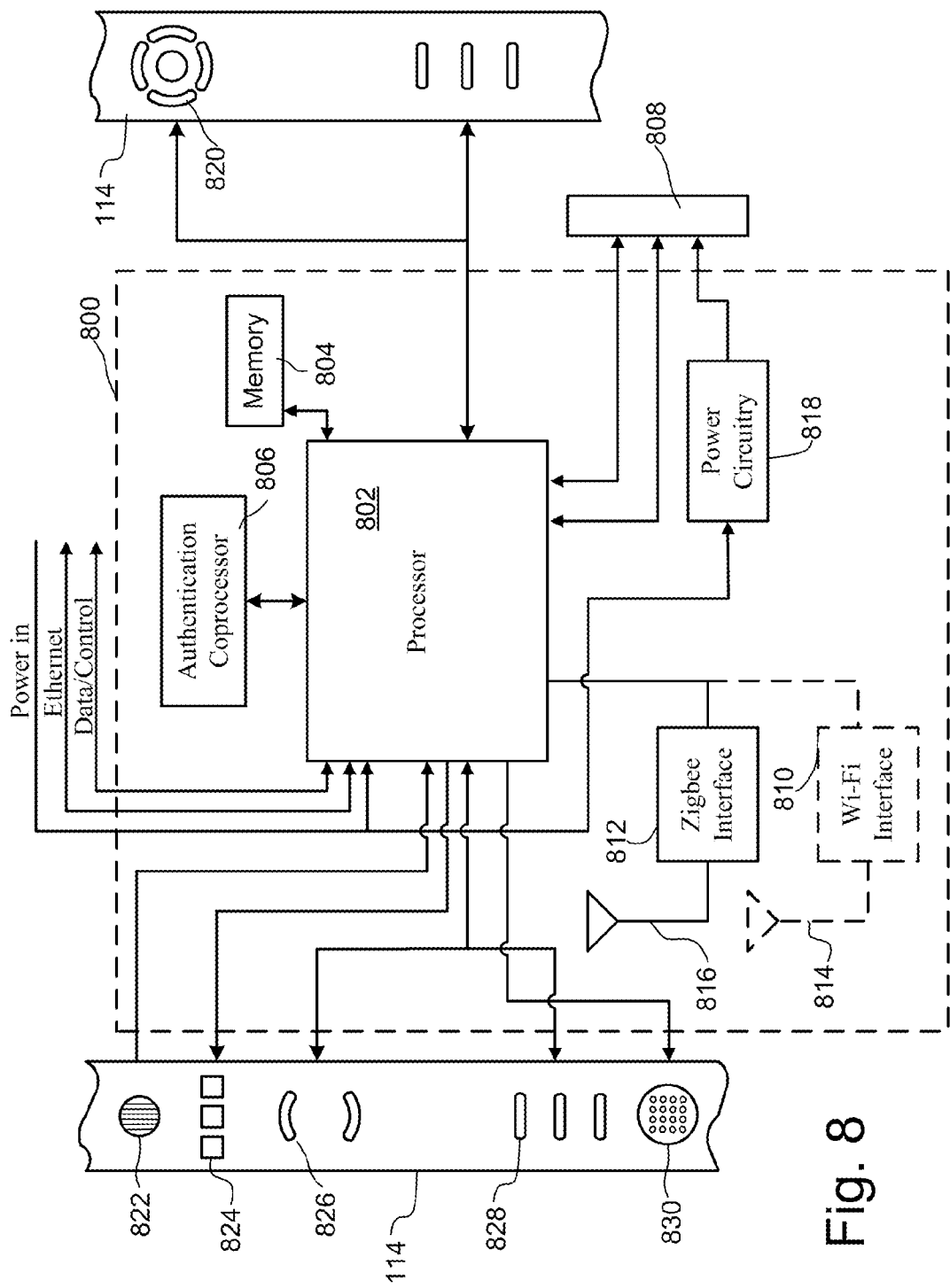
FIG. 8 is an illustrative block diagram of the various circuitry disposed in the housing of the under-cabinet mounted control system, according to one embodiment of the invention.

Referring to FIG. 8, in various embodiments, the housing 102 includes therein various electronic circuitry that is necessary to connect the touch screen device 602 disposed in the touch screen mounting member 104 to a home automation system, security system, and/or home entertainment system.

In these various embodiments, such circuitry includes, but is not limited to, a processor 802, memory 804, an authentication processor 806 (an encryption chip licensed from Apple, Inc., that is included in devices that are officially licensed to communicate with Apple® products), a Wi-Fi interface 810 and associated antenna 814 and/or a Zigbee interface 812 and associated antenna 816 (for wirelessly connecting to a network), an infrared interface and emitter/receiver, power circuitry 818 for a house line voltage adapter and for charging a battery of a connected touch screen device, a wired Ethernet connection, circuitry for receiving control from various hard buttons 820, 826 disposed on the frame 114, circuitry for controlling indicator lights 824, 828 disposed on the frame 114, circuitry for receiving or transmitting audio/video data, and circuitry for controlling a microphone 830 and speaker 822 disposed on the frame 114. In another embodiment, the housing 102 includes circuitry for proving power over Ethernet. In still another embodiment, the housing 102 includes circuitry for outputting audio and/or video to external devices.

Figure 9:
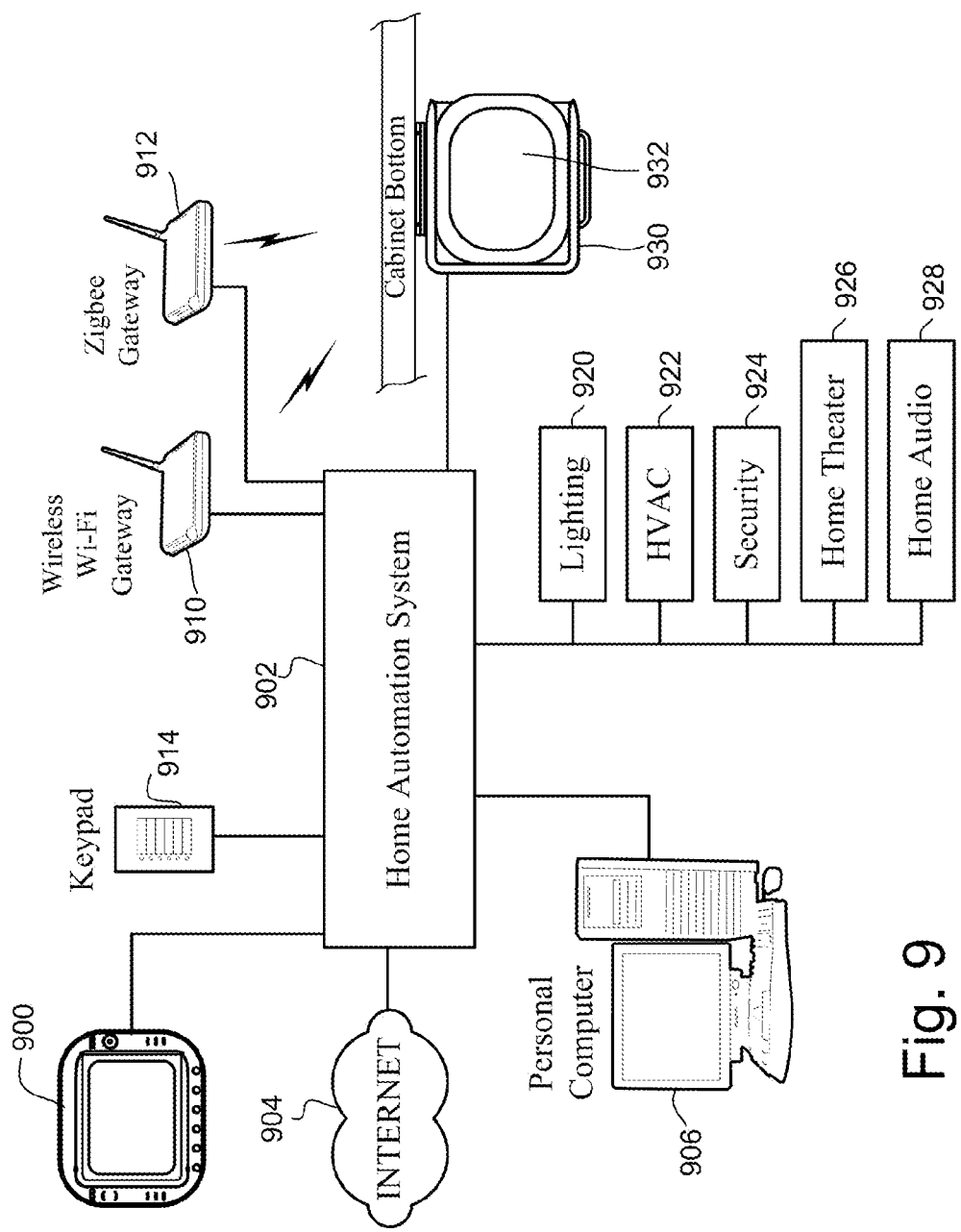
FIG. 9 is an illustrative block diagram of a home automation system employing the under-cabinet mounted control system including a touch screen device, according to one embodiment of the invention.

Referring to FIG. 9, a home automation system 902 for controlling various devices is shown. In various embodiments, the home automation system 902 controls lighting 920, HVAC 922, security 924, home theater 926, and/or home audio 928. The home automation system 902 is in communication with, and can be configured and controlled by, a personal computer 906, a wall-mounted touch screen 900, a wall keypad 914, and/or an under-cabinet mounted control system 930 with a connected portable touch screen device 932. The under-cabinet control system 930 and portable touch screen device 932 communicate with, and control, the home automation system 902 via a Wi-Fi gateway 910, a Zigbee gateway 912, or a wired Ethernet connection.

In various embodiments, each of the structural components of the under-cabinet control system are made of plastic, aluminum, stainless steel, fiberglass, or any other appropriate material known to those skilled in the art. Further, each of the electrical components of the under-cabinet control system is made of the appropriate materials known to those skilled in the art.

Figure 10:
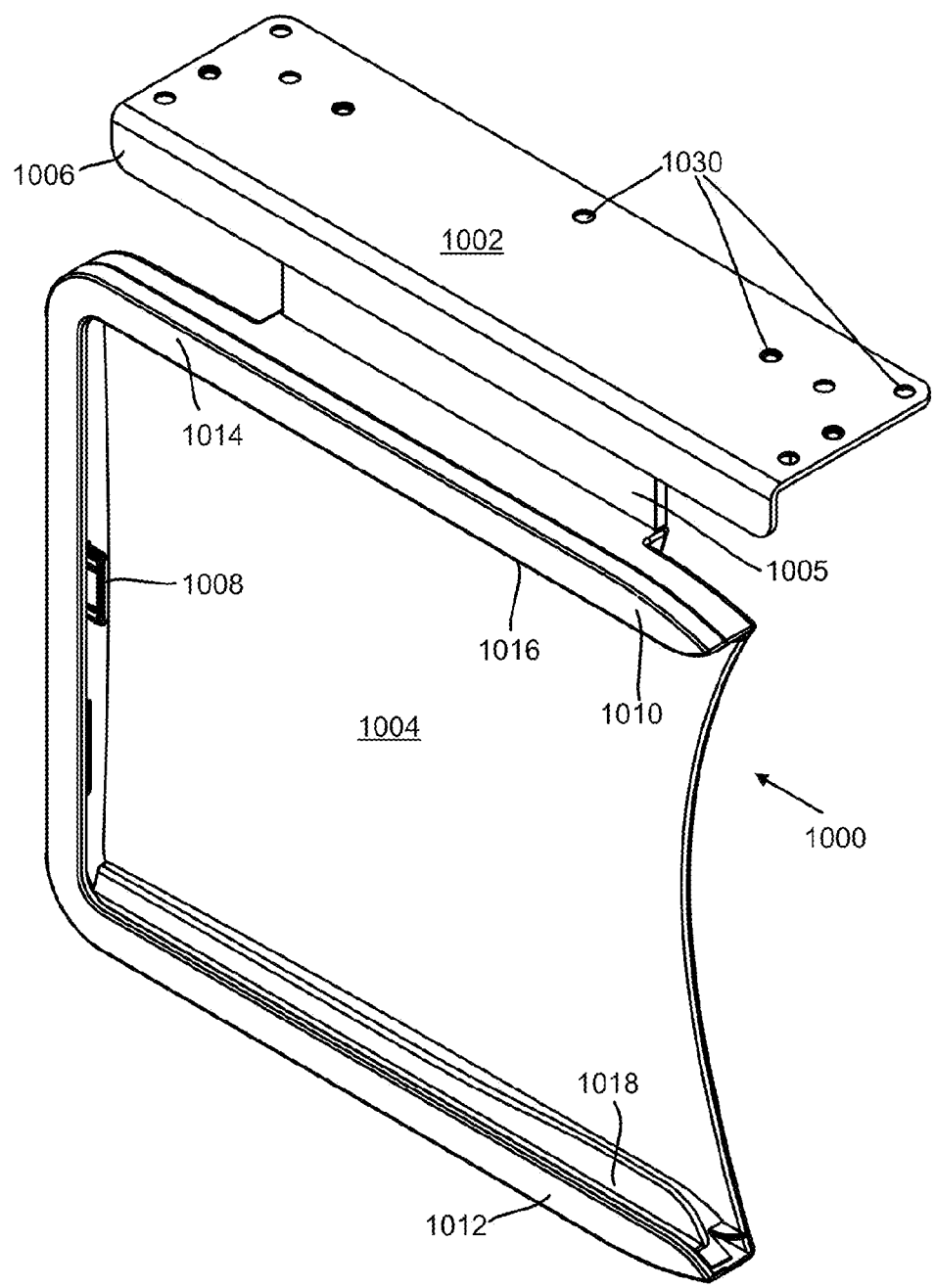
FIG. 10 is an illustrative isometric front view of the under-cabinet mounted control system for a touch screen device in a 90 degree open position, according to another embodiment of the invention.
Figure 11:
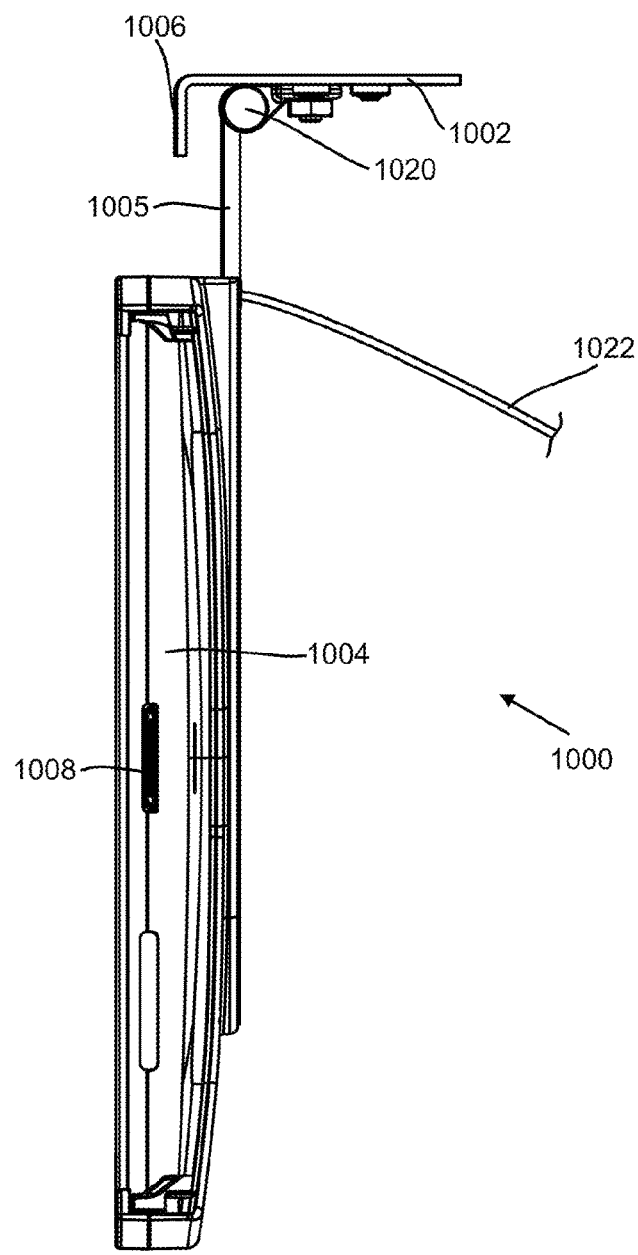
FIG. 11 is an illustrative orthographic side view of the under-cabinet mounted control system for a touch screen device of FIG. 10.
Figure 12:
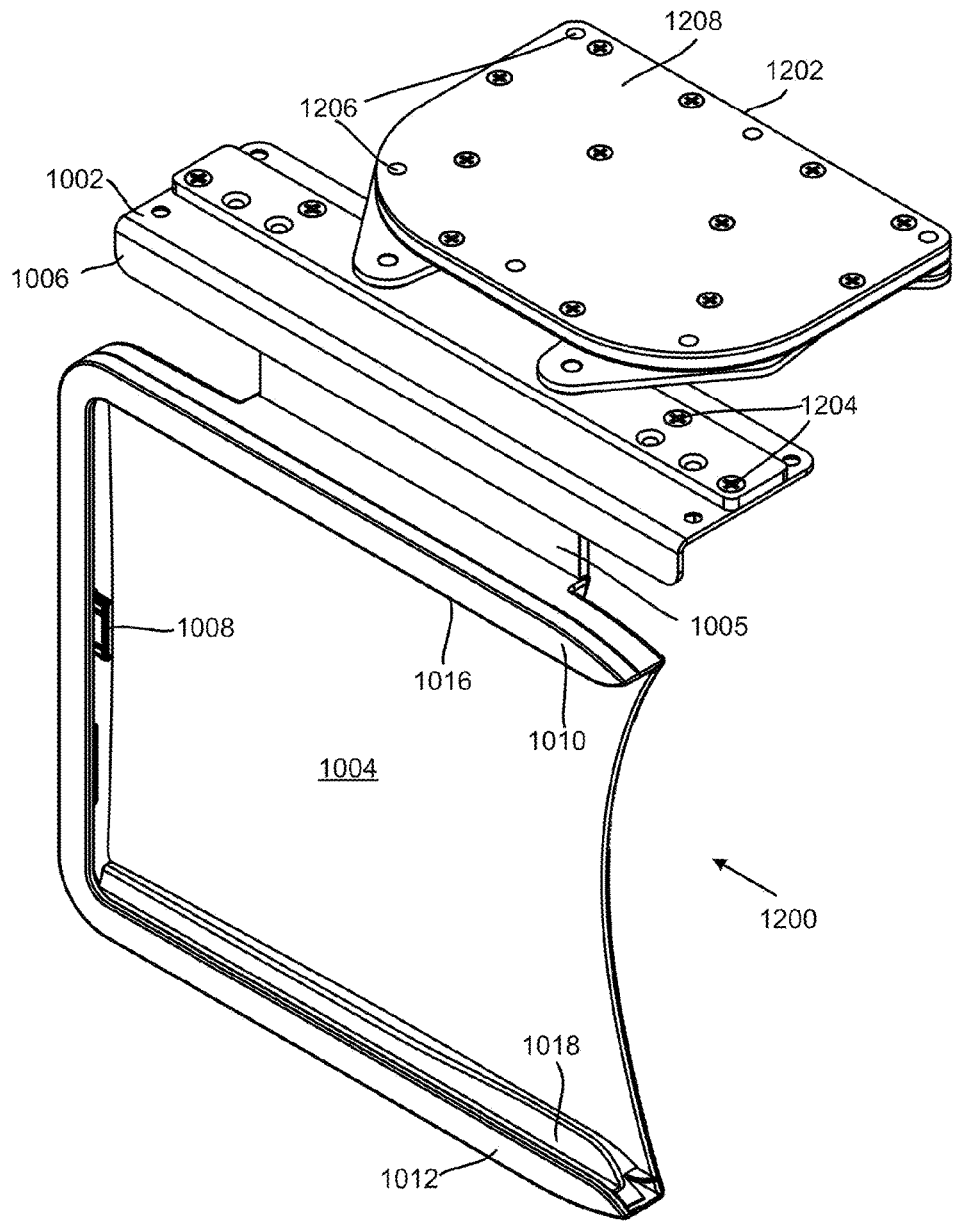
FIG. 12 is an illustrative isometric front view of the under-cabinet mounted control system for a touch screen device in a 90 degree open position and including a swivel bracket, according to another embodiment of the invention.
Figure 13:
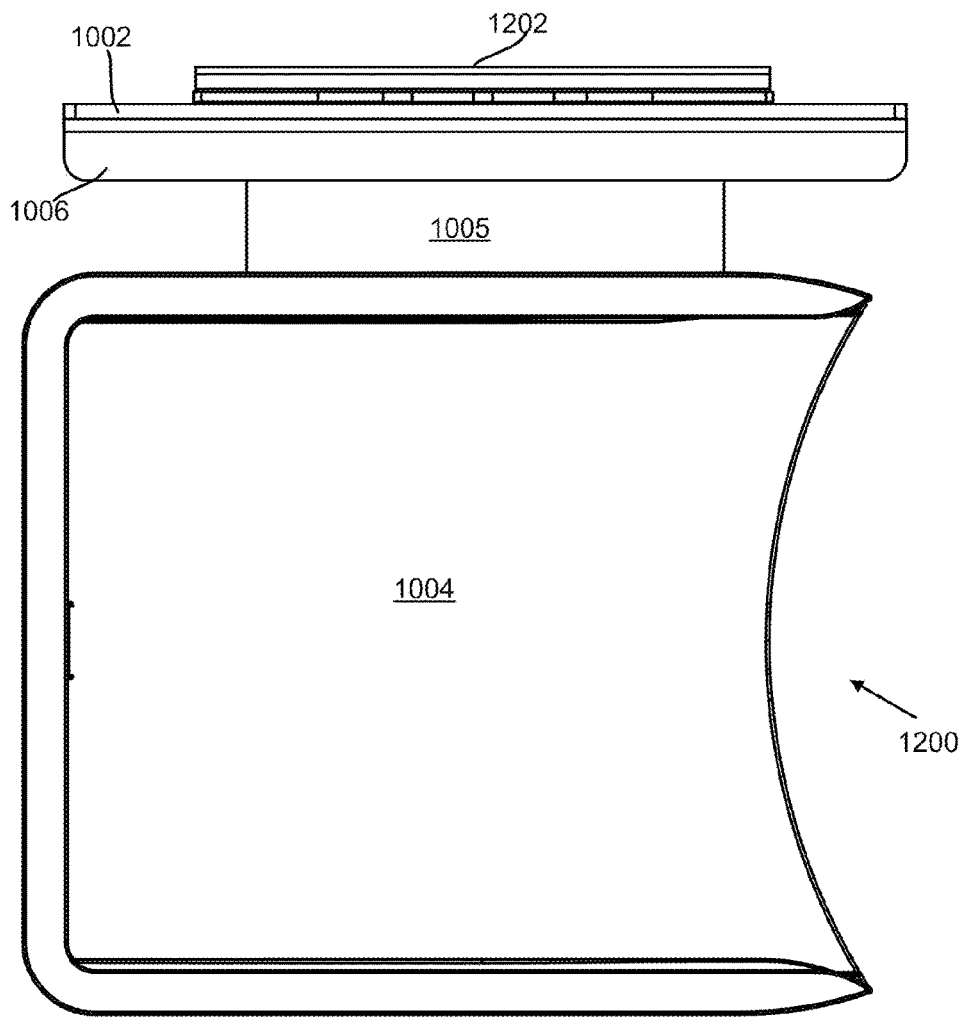
FIG. 13 is an illustrative orthographic front view of the under-cabinet mounted control system for a touch screen device of FIG. 12.
Figure 14:
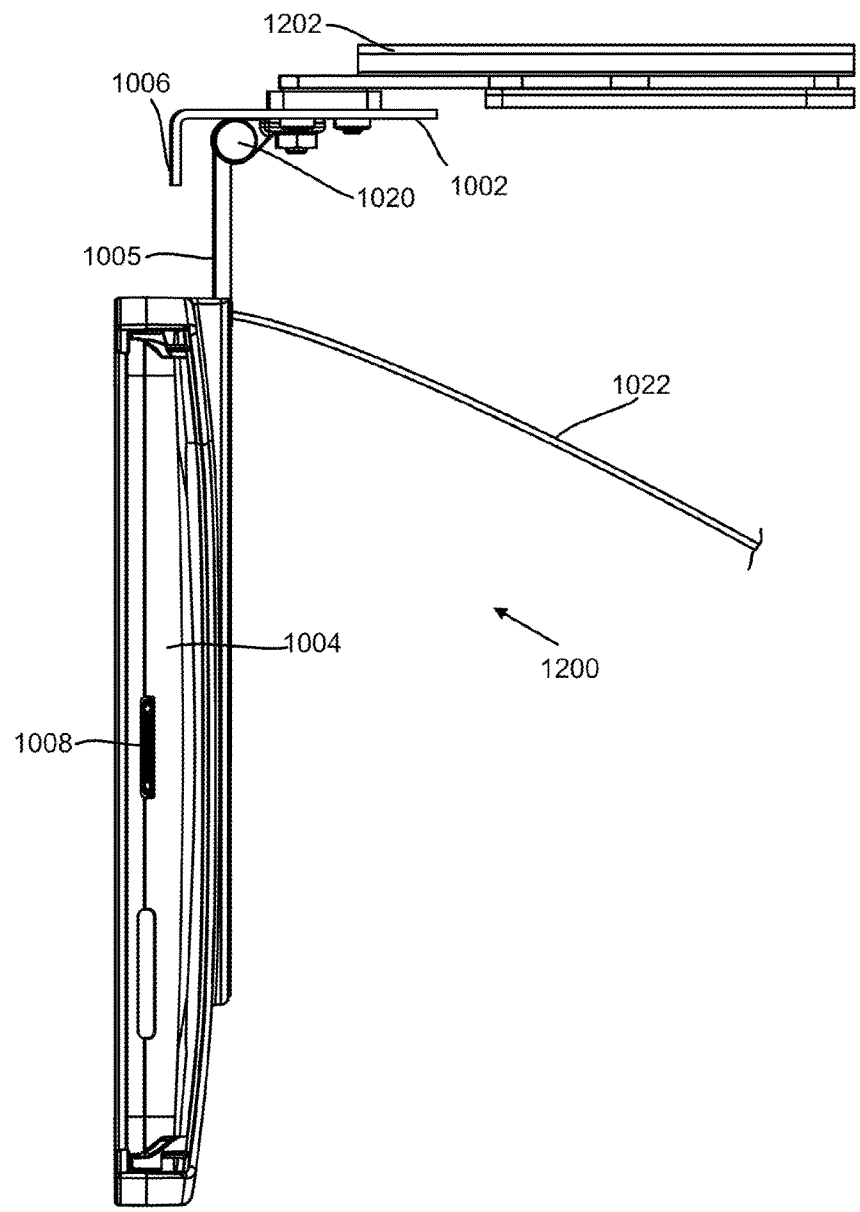
FIG. 14 is an illustrative orthographic side view of the under-cabinet mounted control system for a touch screen device of FIG. 12.
Figure 15:
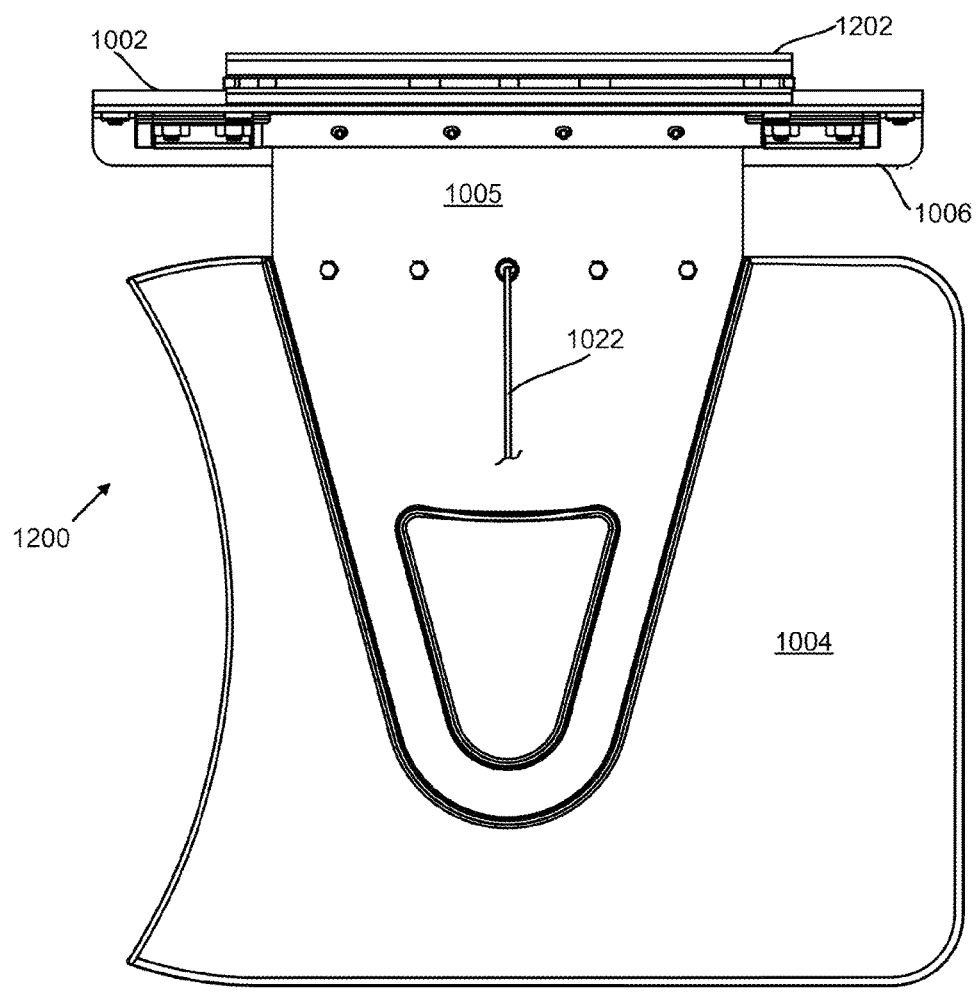
FIG. 15 is an illustrative orthographic rear view of the under-cabinet mounted control system for a touch screen device of FIG. 12.
Figure 16:
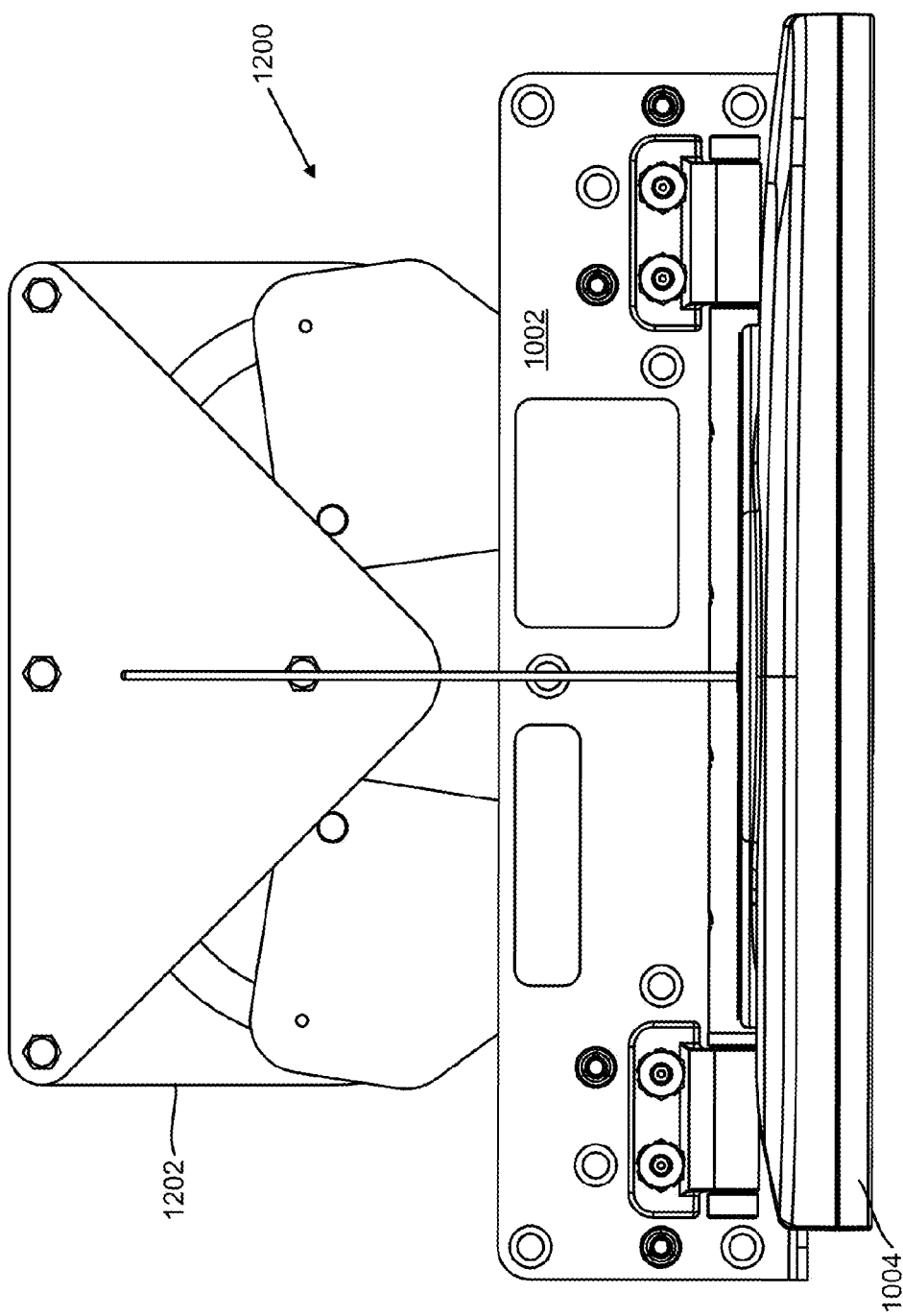
FIG. 16 is an illustrative orthographic bottom view of the under-cabinet mounted control system for a touch screen device of FIG. 12.
Figure 17:
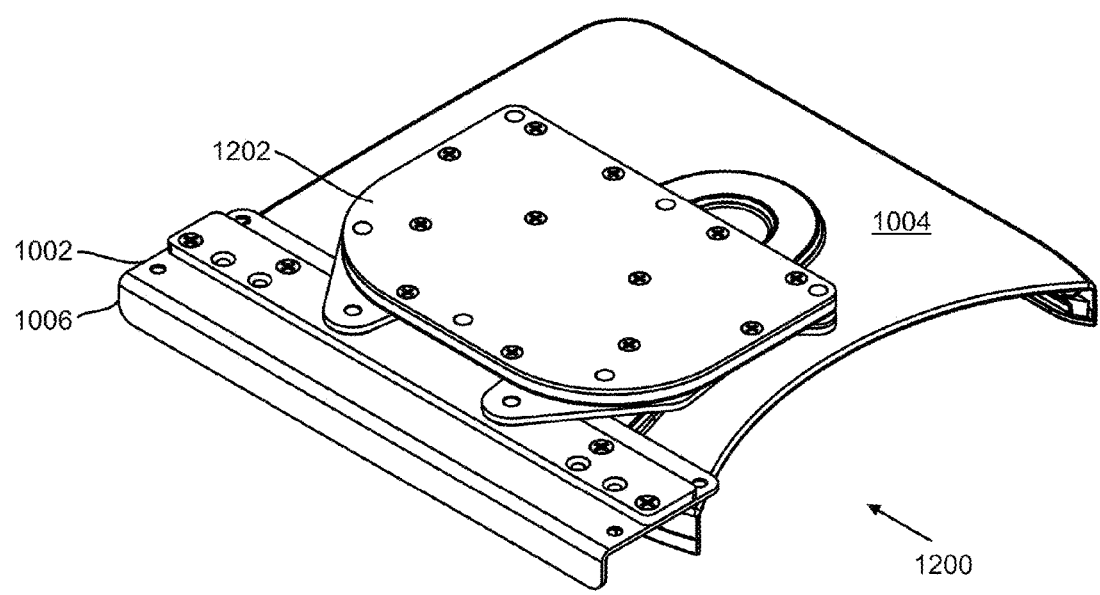
FIG. 17 is an illustrative isometric view of the under-cabinet mounted control system for a touch screen device of FIG. 12 in a folded/closed position.
Figure 18:
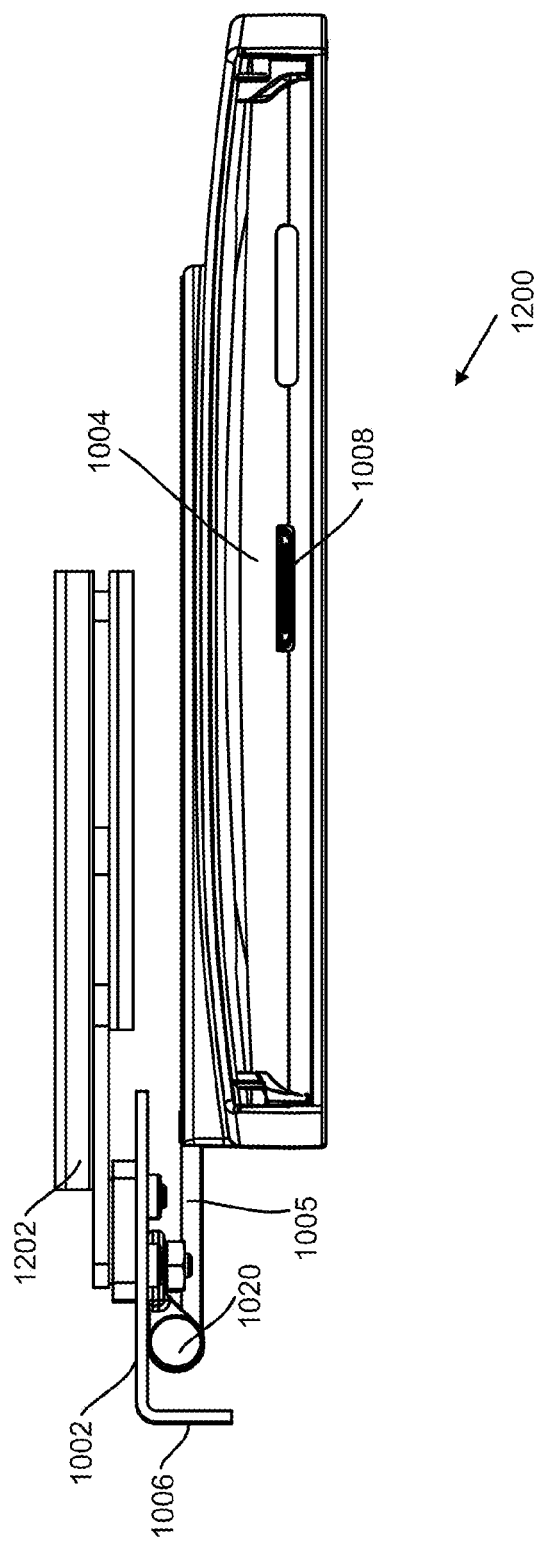
FIG. 18 is an illustrative orthographic side view of the under-cabinet mounted control system for a touch screen device of FIG. 17.

Referring to FIGS. 10 and 11, in another embodiment, an under-cabinet control system 1000 is shown. The under-cabinet control system 1000 includes a mounting bracket 1002, a touch screen mounting member 1004, a connecting member 1005, a bracket hinge 1020, and a maximum open stop 1006. The touch screen mounting member 1004 includes a docking connector 1008, a power cable 1022, a bezel/frame 1014, an upper track 1010 with an upper groove 1016, and a lower track 1012 with a lower groove 1018.

The mounting bracket 1002 is configured to be attached to an underside of a counter, shelf, table, or cabinet using screws disposed through two or more screw holes 1030. The connecting member 1005 is coupled to the touch screen mounting member 1004, and moveably coupled to the mounting bracket 1002 via the hinge 1020. In various embodiments, the touch screen mounting member 1004 is moveable and can be disposed in any position between fully closed (i.e., up) position (e.g., see FIG. 22) and fully open i.e., down and angled forward, see FIG. 23) via rotation about the horizontal axis of the hinge 1020.

Figure 20:
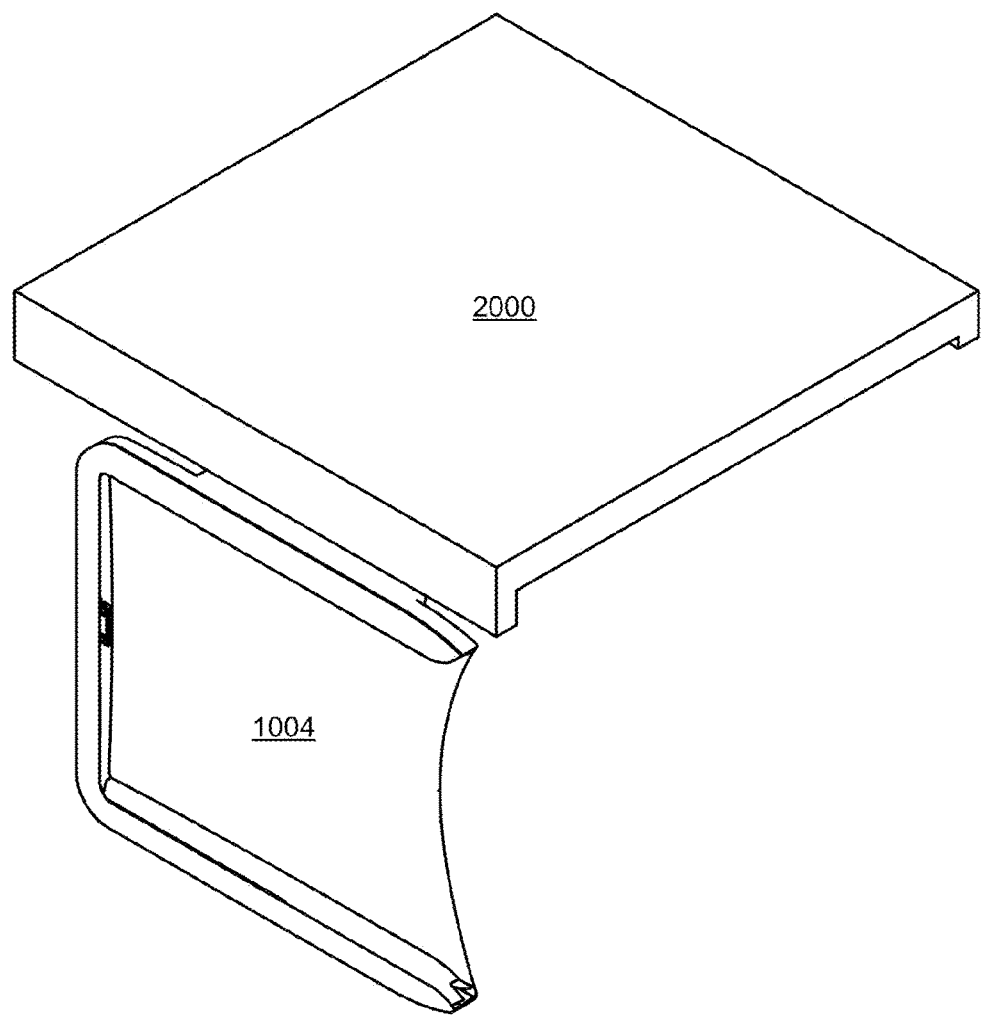
FIG. 20 is an illustrative isometric front view of the under-cabinet mounted control system for a touch screen device of FIG. 12 mounted to the underside of a self, according to another embodiment of the invention.
Figure 21:
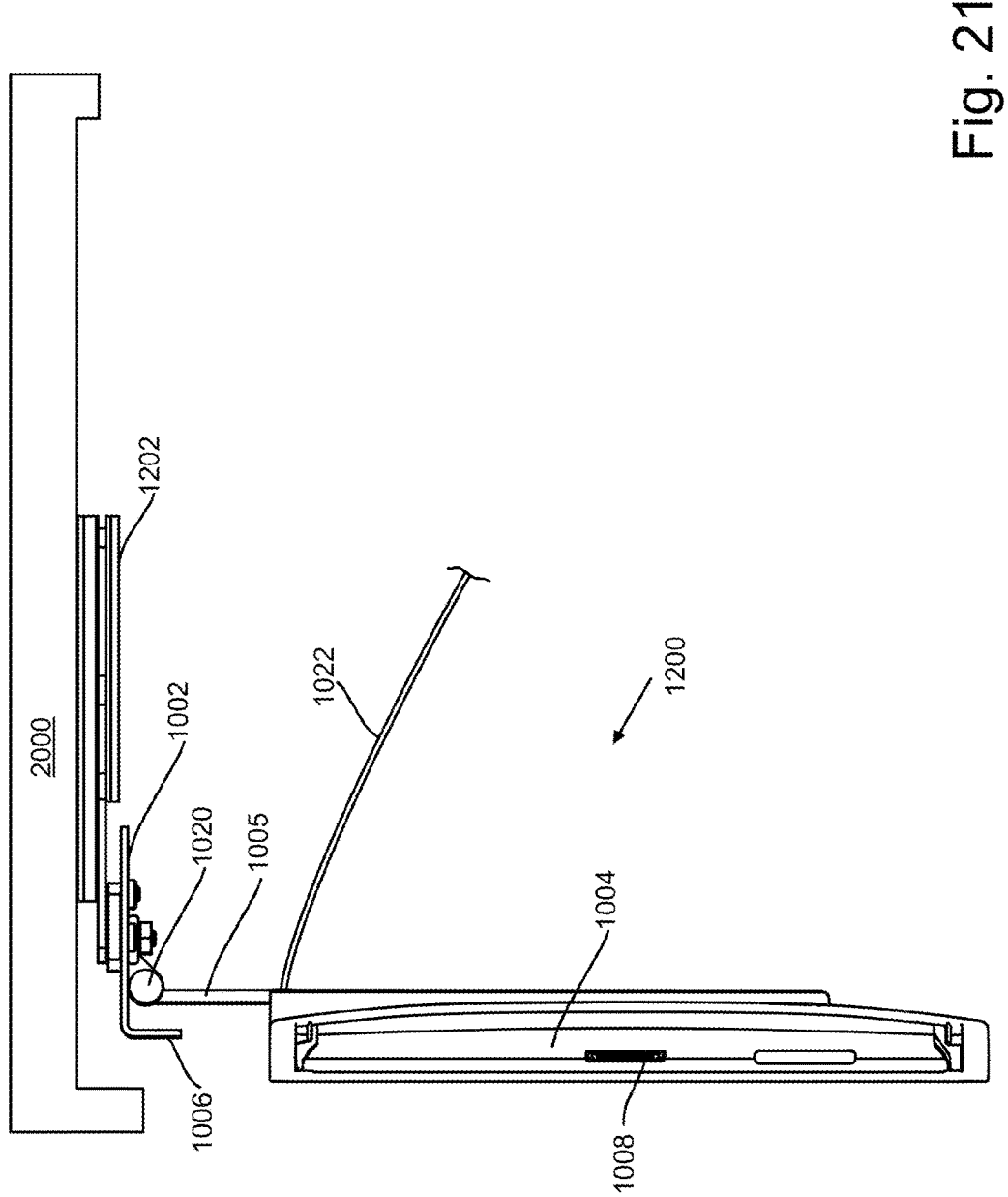
FIG. 21 is an illustrative orthographic side view of the under-cabinet mounted control system for a touch screen device of FIG. 14 mounted to the underside of a self, according to another embodiment of the invention.
Figure 22:
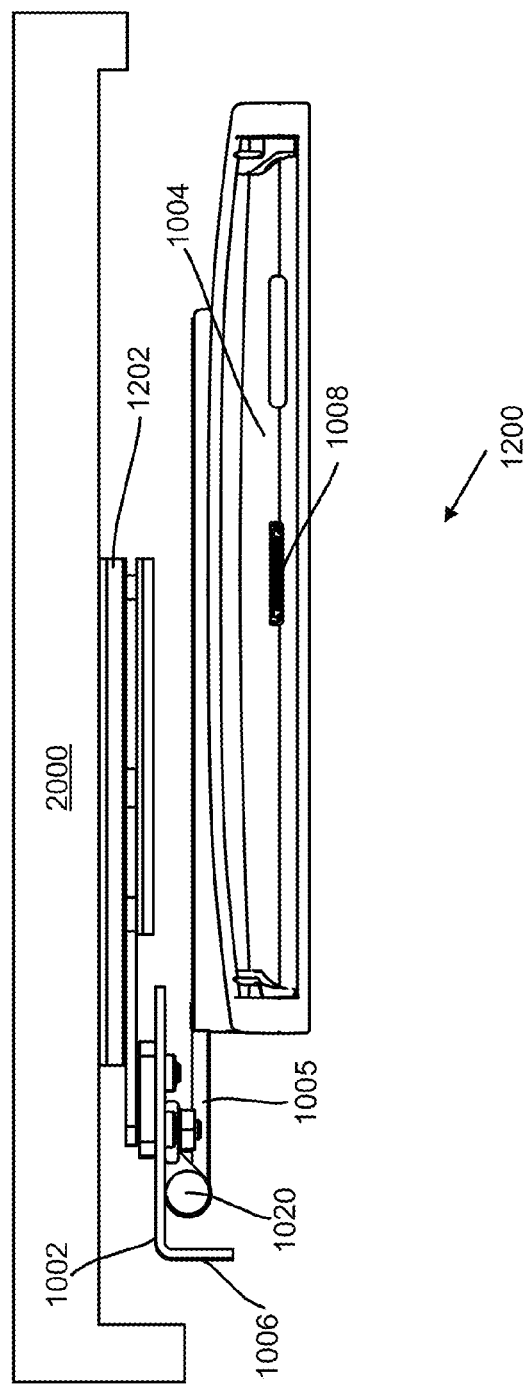
FIG. 22 is an illustrative orthographic side view of the under-cabinet mounted control system for a touch screen device of FIG. 18 mounted to the underside of a self, according to another embodiment of the invention.
Figure 23:
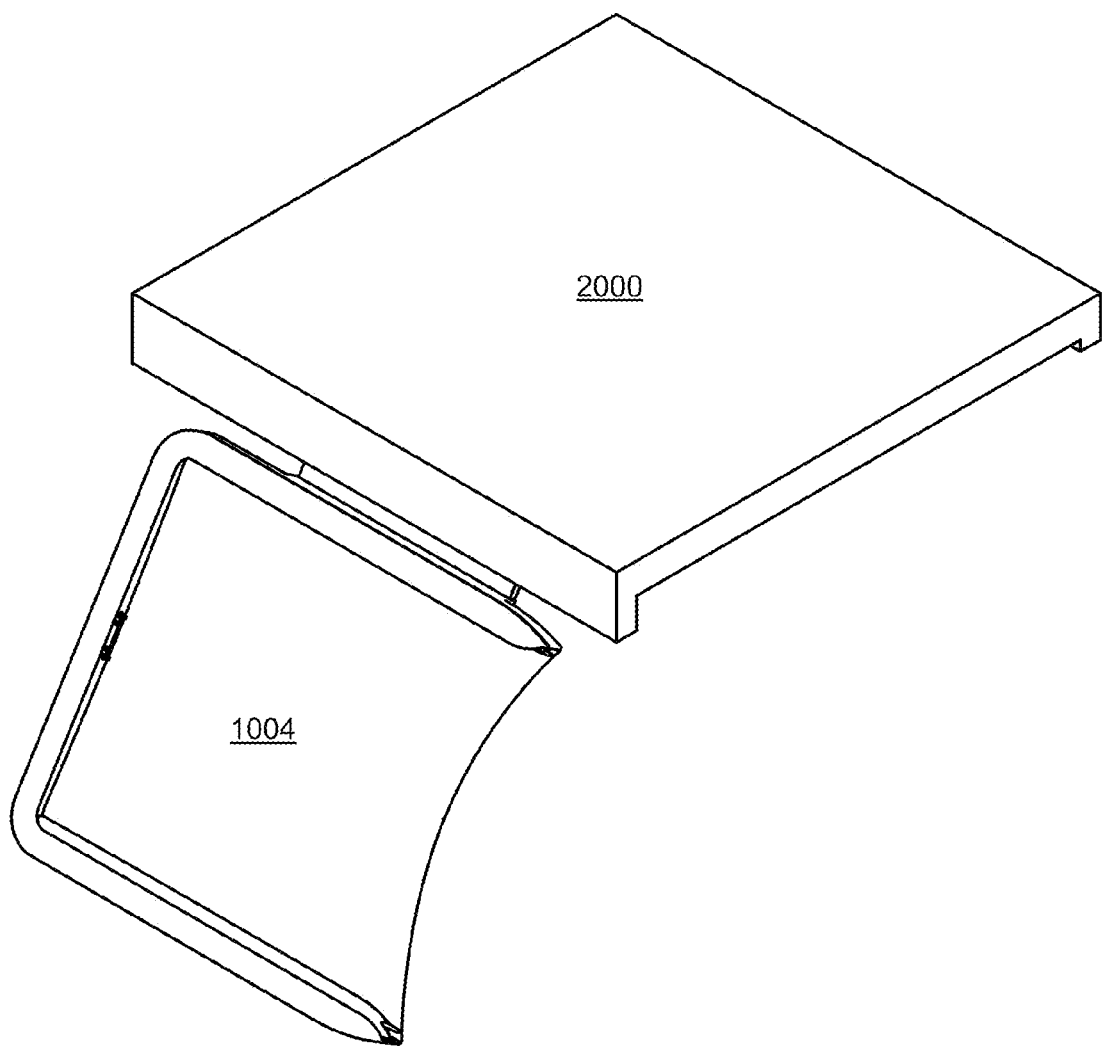
FIG. 23 is an illustrative isometric front view of the under-cabinet mounted control system for a touch screen device of FIG. 20 in a 120 degree open position.

Specifically, the touch screen mounting member 1004 can be moved from a fully closed position (zero degrees from the mounting bracket 1002, e.g., see FIG. 22) until it contacts the maximum open stop 1006, which is 120 degrees from the mounting bracket 1002 (see FIG. 23). For example, the mounting member 1004 can be angled up (120 degrees from the mounting bracket 1002) for easier touch screen typing/data entry, or perpendicular to the cabinet underside (90 degrees from the housing, see FIG. 20) for direct viewing, or angled down (45 degrees from the mounting bracket 1002) for viewing when the user is sitting below the touch screen mounting member 1004 and looking up.

In other embodiments, the touch screen mounting member 1004 can be moved to an open position that is greater than 120 degrees from the mounting bracket 1002. In still other embodiments, the touch screen mounting member 1004 can be moved to any of a plurality of adjustable hard stops occurring at 15 degree (or other) increments from 0 to 180 degrees from the mounting bracket 1002.

In one embodiment, the touch screen mounting member 1004 stays in a selected position via a friction fit hinge. In another embodiment, the touch screen mounting member 1004 stays in a selected position via a locking hinge, or by other methods known in the art.

The mounting member 1004 is dimensioned to receive a particular touch screen device. In other words, the upper track 1010 with the upper groove 1016, and the lower track 1012 with the lower groove 1018 are dimensioned to accommodate and hold a particular size touch screen device. For example, in one embodiment, the upper track 1010 with the upper groove 1016, and the lower track 1012 with the lower groove 1018 are dimensioned to accommodate and hold a tablet computer (see FIGS. 26 and 27). In another embodiment, the upper track 1010 with the upper groove 1016, and the lower track 1012 with the lower groove 1018 are dimensioned to accommodate and hold a smart phone.

Figure 26:
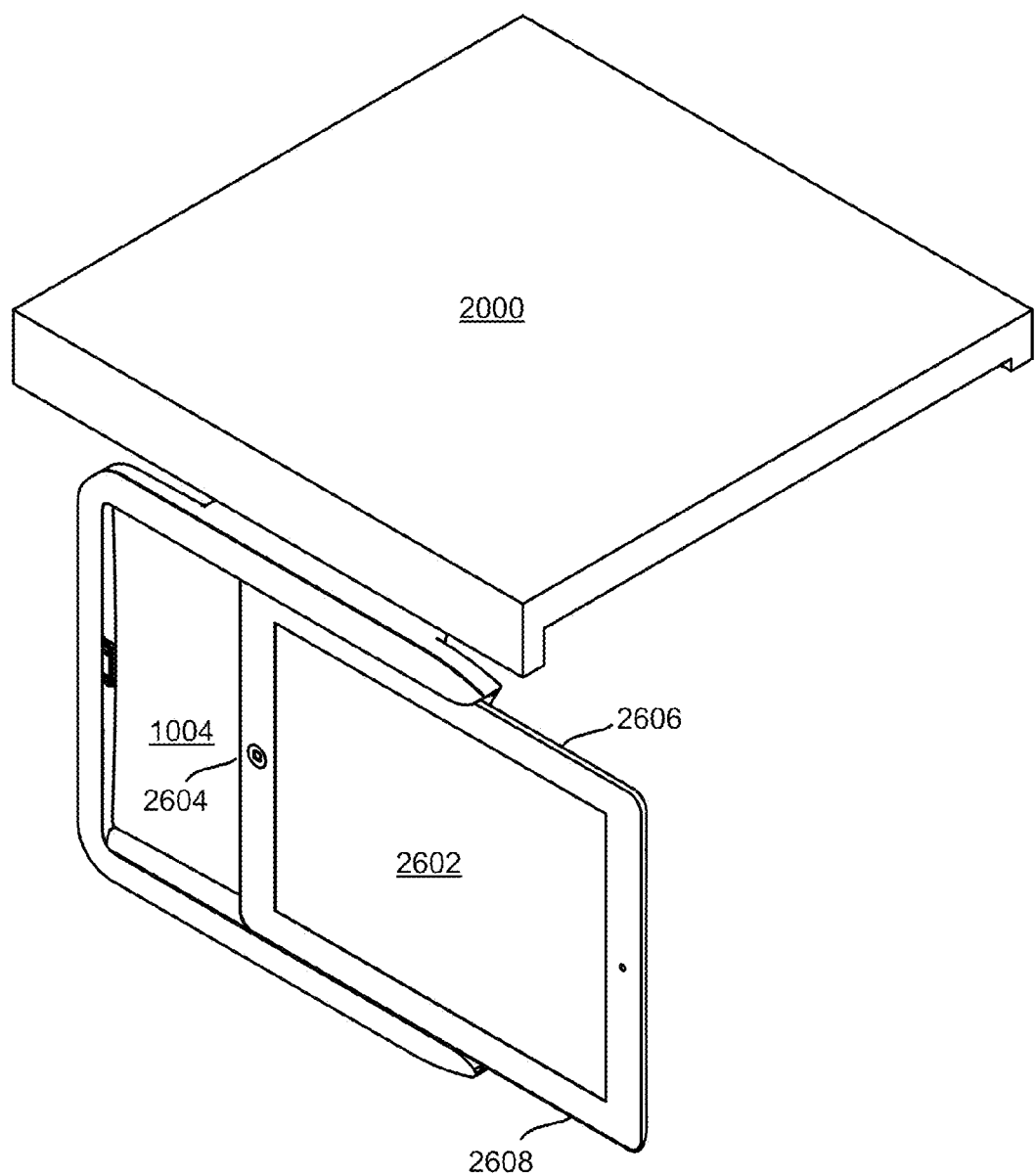
FIG. 26 is an illustrative isometric front view of the under-cabinet mounted control system for a touch screen device of FIG. 20 including a tablet computer, according to another embodiment of the invention.
Figure 27:
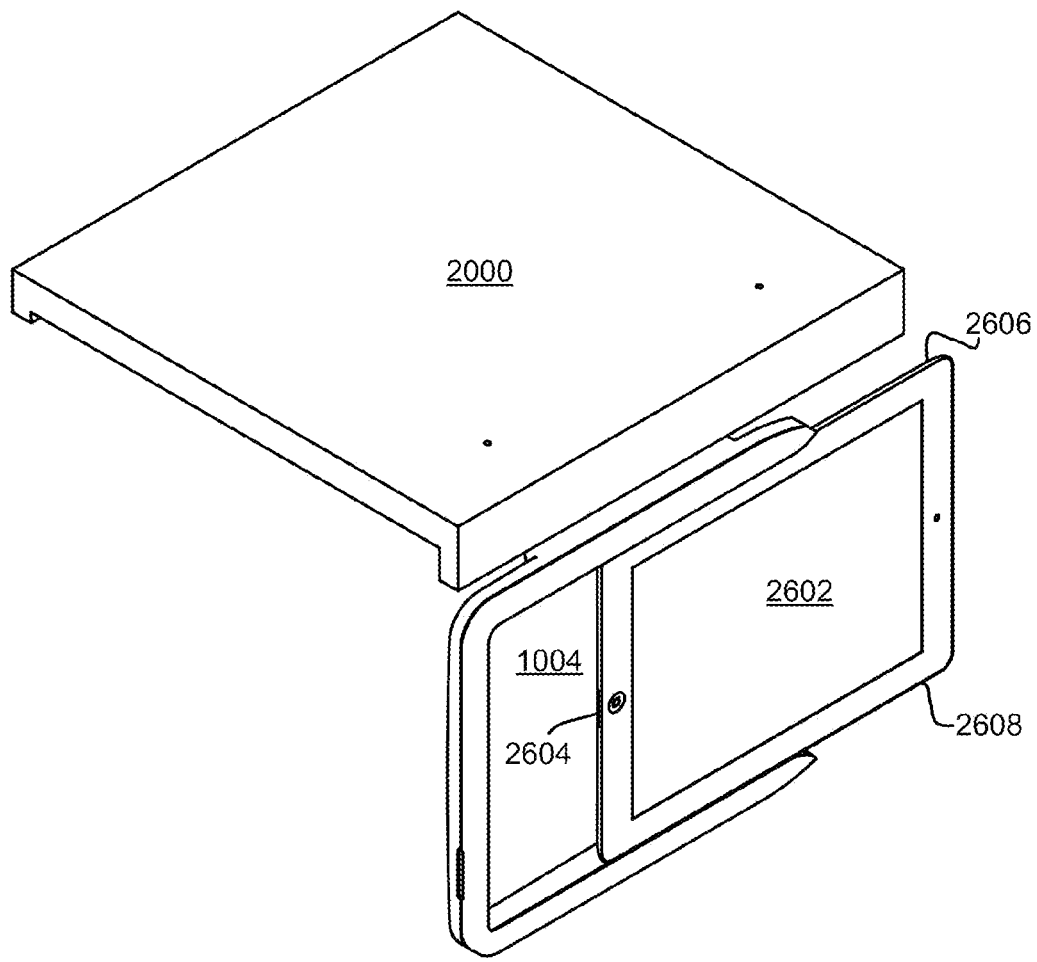
FIG. 27 is an alternative illustrative isometric front view of the under-cabinet mounted control system for a touch screen device of FIG. 20 including a tablet computer.

Further, the docking connector 1008 is configured to electrically mate with a connector 2604 disposed on the particular touch screen device (see FIGS. 26 and 27). The power cable 1022 is in electrical communication with the docking connector and is configured to plug into a standard wall outlet or can be hardwired to a house's electrical system. In various embodiments, the power cable 1022 includes a voltage adapter configured to supply the proper voltage to the particular touch screen device disposed in the touch screen mounting member 1004.

Referring to FIGS. 12-18, in yet another embodiment, an under-cabinet control system 1200 is shown. The under-cabinet control system 1200 includes all the elements and features of the under-cabinet control system 1000 shown in FIGS. 10 and 11 and described above, with the addition of a swivel bracket 1202. The swivel bracket 1202 is coupled to the mounting bracket 1002 with machine screws 1204 disposed through two or more screw holes 1030. The swivel bracket 1202 is configured to be attached to an underside of a counter, shelf, table, or cabinet (see FIGS. 20-24) using screws disposed through two or more screw holes 1206.

Figure 24:
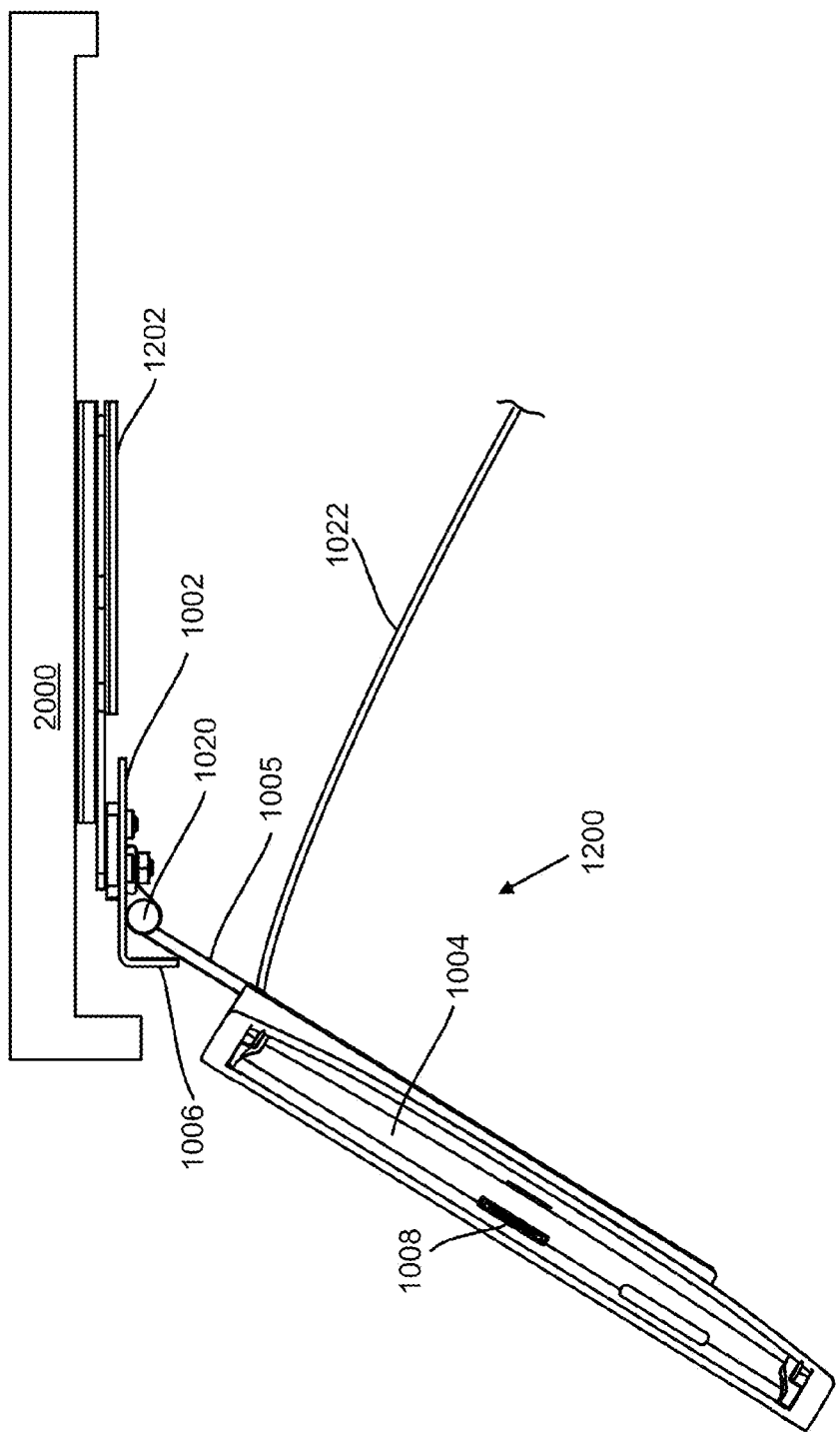
FIG. 24 is an illustrative orthographic side view of the under-cabinet mounted control system for a touch screen device of FIG. 23.
Figure 25:
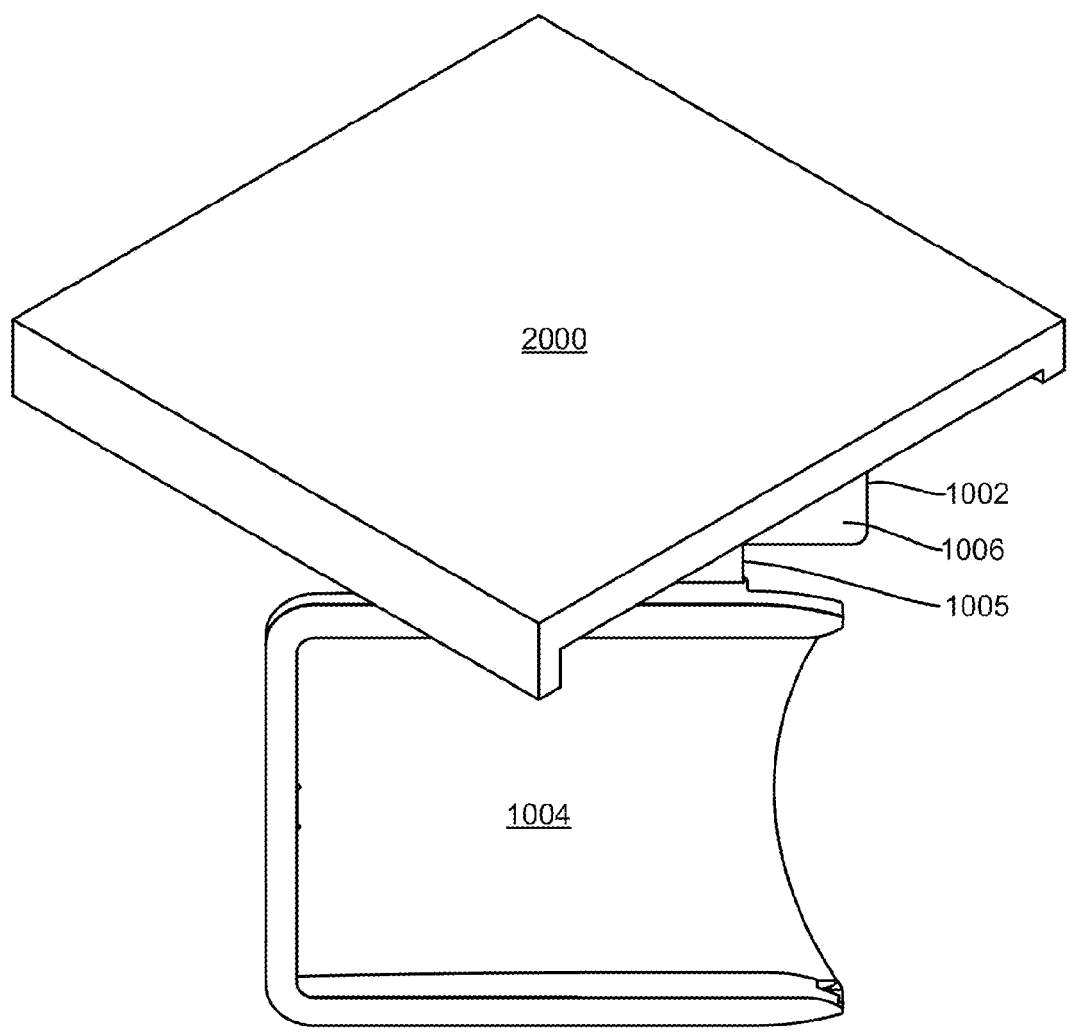
FIG. 25 is an illustrative isometric front view of the under-cabinet mounted control system for a touch screen device of FIG. 20 rotated 45 degrees, according to another embodiment of the invention.

Similar to the under-cabinet control system 1000, the touch screen mounting member 1004 of the under-cabinet control system 1200 is moveable and can be disposed in any position between fully closed (i.e., up) position (see FIG. 22) and fully open i.e., down and angled forward to 120 degrees, see FIGS. 23 and 24) via rotation about the horizontal axis of the hinge 1020. In addition, the touch screen mounting member 1004 of the under-cabinet control system 1200 is rotatable in a plane parallel to the horizontal axis of the hinge 102 as shown in FIG. 25. Specifically, the swivel bracket allows the touch screen mounting member 1004 to rotate from zero degrees (see FIG. 20) to +45 degrees (see FIG. 25) or to −45 degrees (i.e., the opposite direction). In other words, in this embodiment, a touch screen device disposed in the touch screen mounting member 1004 has two degrees of movement.

Figure 19A:
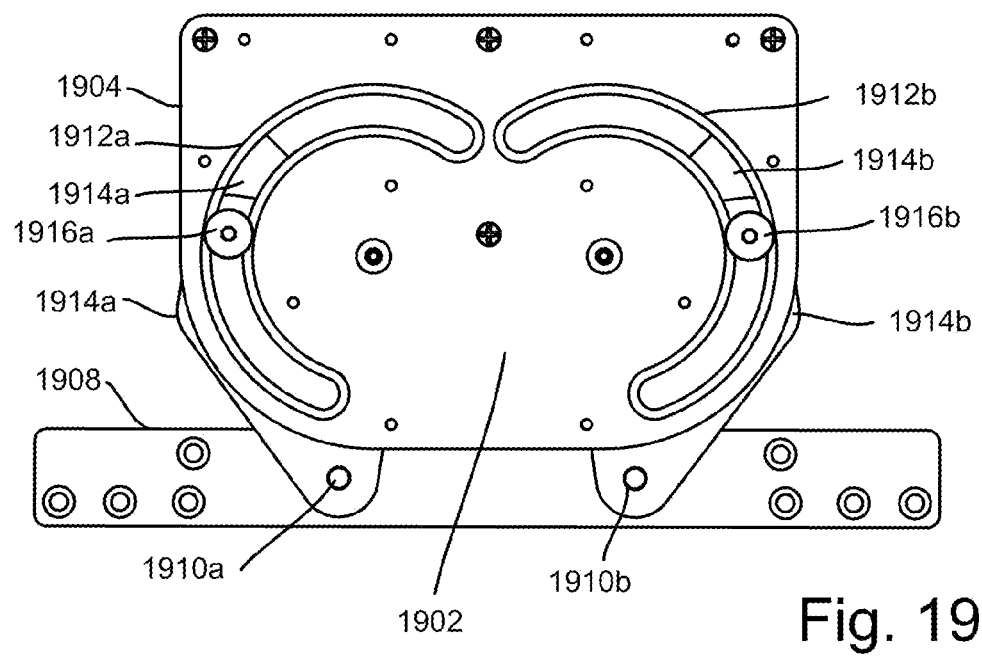
FIG. 19A is an illustrative orthographic top view of a swivel bracket, according to another embodiment of the invention.
Figure 19B:
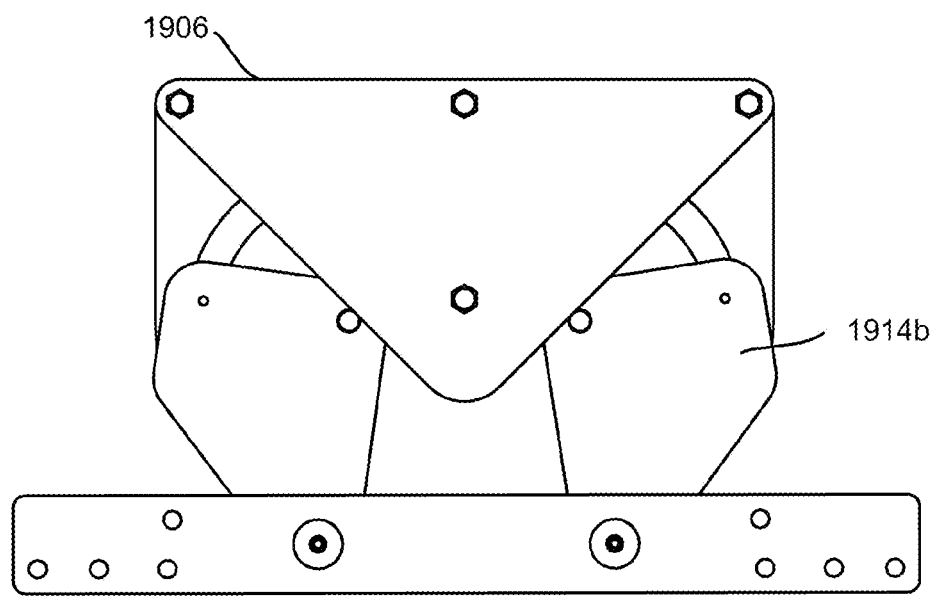
FIG. 19B is an illustrative orthographic bottom view of the swivel bracket device of FIG. 18A.

Referring to FIGS. 19A and 19B, in one embodiment, the swivel bracket 1202 is shown in further detail. Specifically FIG. 19A shows a top view of the swivel bracket 1202 with a top housing plate 1208 (FIG. 12) removed to show the interior mechanism. FIG. 19B shows a bottom view of the swivel bracket 1202. The swivel bracket 1202 includes housing 1902, the top housing plate 1208 (not shown, see FIG. 12), a middle housing plate 1904, a bottom housing plate 1906, mounting member 1908, pivot connections 1910a, 1910b, cam grooves 1912a, 1912b, motion arms 1914a, 1914b, and cam followers 1916a, 1916b.

The mounting member 1908 is configured to couple to the mounting bracket 1002 using machine screws 1204. The cam follower 1916a is coupled to motion arm 1914a, and the cam follower 1916b is coupled to motion arm 1914b. The cam followers 1916a, 1916b are configured and dimensioned fit and move within the cam grooves 1912a, 1912b, respectively. The motions arms 1914a, 1914b are coupled to the mounting member 1908 at the pivot connections 1910a, 1910b, respectively.

Referring to FIGS. 19A and 25, in operation, when a user rotates the touch screen mounting member 1004 as shown in FIG. 25, the mounting member 1908 pulls the motion arm 1914a, and pushes the motion arm 1914b. The motion arm 1914a pivots at pivot connection 1910a and pulls cam follower 1916a outward along the cam groove 1912a. The motion arm 1914b pivots at pivot connection 1910b and pushes the cam follower 1916b inward along the cam groove 1912b. The result of this motion is that the touch screen mounting member 1004 slides under the counter as it is rotated to prevent the side of the touch screen mounting member 1004 from extending too far out from under the cabinet.

Referring to FIGS. 12 and 20-27, in one embodiment, in operation, a user moves the mounting member 1004 from the closed position (see FIG. 22) to the open position (see FIGS. 20 and 21) as described above. The user then takes an appropriately sized portable touch screen device 2602 and orients the touch screen device 2602 so that a connector 2604 on the touch screen device 2602 is positioned to mate with the docking connector 1008. The user then slides opposite edges 2606 and 2608 of the frame of the touch screen device 2602 (i.e., edges that are perpendicular to the edge that includes the connector 2604) into the upper groove 1016 of the upper track 1010 and the lower groove 1018 of the lower track 1012 (see FIG. 12). The user then pushes the touch screen device 2602 until the touch screen device connector 2604 electrically mates with the docking connector 1008. Thereafter the user is free to position the touch screen mounting member 1004 holding the touch screen device 2602 at any angle from zero to 120 degrees or, when in an open position, rotate the touch screen device 2602 to any angle between +/−45 degrees. Additionally, once the touch screen device 2602 is disposed in the touch screen mounting member 1004, the touch screen mounting member 1004 may also be moved to the closed position (FIG. 22).

In still other embodiments, the under-cabinet touch screen control system 1000 and the under-cabinet touch screen control system 1200 each also include a housing that includes therein various electronic circuitry that is necessary to connect the touch screen device 2602 disposed in the touch screen mounting member 1004 to a home automation system, security system, and/or home entertainment system, as described in detail above with respect to FIGS. 8 and 9.

The disclosed under-cabinet touch screen control system provides a means for a touch screen device to be connected to a docking station and powered and/or charged, and connected to a network without taking up valuable table or wall space. Further, the touch screen device can be moved (folded) out of the way when not in use. Additionally, any wires (e.g., power, Ethernet) that connect to the under-cabinet touch screen control system can be easily routed under and behind a cabinet, shelf, or counter and out of sight.

List of Acronyms Used in the Detailed Description of the Invention

The following is a list of the acronyms used in the specification in alphabetical order.
AC alternating current
HVAC heating ventilation and air conditioning
LCD liquid crystal display
LED light emitting diode
Wi-Fi wireless fidelity Alternate Embodiments Variations, modifications, and other implementations of what is described herein may occur to those of ordinary skill in the art without departing from the spirit and scope of the invention. Accordingly, the invention is not to be defined exclusively by the preceding illustrative description.

What is claimed is:

1. An under-cabinet mounted control system for a portable touch screen device, the control system comprising
a swivel bracket comprising a mounting member, a housing, a top housing plate, a middle housing plate that defines a first cam groove and a second cam groove, a bottom housing plate, a first pivot connection disposed on the swivel bracket mounting member, a second pivot connection disposed on the swivel bracket mounting member, a first motion arm, a second motion arm, a first cam follower, and a second cam follower, the first cam follower being dimensioned and arranged for moving within the first cam groove and coupled to the first motion arm, the second cam follower being dimensioned and arranged for moving within the second cam groove and coupled to the second motion arm, the first motion arm being coupled to the swivel bracket mounting member at the first pivot connection, and the second motion arm being coupled to the swivel bracket mounting member at the second pivot connection, the swivel bracket being configured for mounting entirely under a cabinet, shelf, table, or counter, the mounting member being moveable from +45 degrees to −45 degrees in a plane parallel to the bottom of the cabinet, shelf, table, or counter;

a mounting bracket coupled to the mounting member;

a touch screen mounting member comprising a first track and a second track parallel to the first track, the first track and the second track being dimensioned and arranged for receiving opposite edges of the portable touch screen device, the touch screen mounting member being rotatably coupled to the mounting bracket and configured for releaseably holding the portable touch screen device between the first track and the second track, the touch screen mounting member being moveable between a fully closed position disposed completely under the cabinet, shelf, table, or counter 0 degrees from the bottom of the cabinet, shelf, table, or counter and a fully open position extending out from under the cabinet, shelf, table, or counter 120 degrees from the bottom of the cabinet, shelf, table, or counter with the portable touch screen device disposed between the first track and the second track, the touch screen mounting member when rotated in one direction in a plane parallel to the bottom of the cabinet, shelf, table, or counter pulls the first motion arm and simultaneously pushes the second motion arm, the first motion arm pivots at the first pivot connection and pulls the first cam follower outward along the first cam groove, the second motion arm simultaneously pivots at the second pivot connection and pushes the second cam follower inward along the second cam groove thereby sliding the touch screen mounting member under the counter as it is rotated; and a docking connector configured for electrically mating with the portable touch screen device.

2. The control system of claim 1, further comprising a processor configured for providing an interface between the portable touch screen device and one or more remote systems.

3. The control system of claim 1, further comprising a communication means configured for establishing communication between the processor the one or more remote systems.

4. The control system of claim 2, wherein the docking connector is configured for electrically mating with the portable touch screen device and establishing electrical communication between the processor and the portable touch screen device.

5. The control system of claim 1, further comprising a plurality of hard buttons, wherein at least one of the plurality of hard buttons is configured for use with an application program executing on the portable touch screen device and at least another one of the plurality of hard buttons is configured to execute a fixed function associated with an external device.

6. The control system of claim 3, wherein the communication means comprises at least one of a wired Ethernet connection, a wireless Ethernet connection, and a wireless Zigbee connection.

7. The control system of claim 1, further comprising a microphone, at least one speaker, and a camera.

8. The control system of claim 1, further comprising an authentication coprocessor.

9. The control system of claim 1, further comprising circuitry configured for charging a battery disposed in the portable touch screen device.

10. The control system of claim 1, further comprising at least one indicator light.

11. The control system of claim 1, further comprising a light emitting diode display or a liquid crystal display.

12. The control system of claim 1, further comprising audio and video interfaces configured for transmitting and receiving audio and video.

13. The control system of claim 1, wherein the touch screen mounting member is rotatably coupled to the mounting bracket with a hinge.

* * * * *